July 26, 1960 H. M. FULDNER ET AL 2,946,265

PATTERN CONTROLLED MILLING MACHINE

Filed April 16, 1958 12 Sheets-Sheet 1

INVENTORS.
HERBERT M. FULDNER.
JOHN M. MORGAN, JR.
JOSEPH A. RAVE, JR.
HERMAN J. BALDWIN.
By Howard E. Keiser
& John F. Verhoeven
ATTORNEYS.

PATTERN CONTROLLED MILLING MACHINE

Filed April 16, 1958

INVENTORS.
HERBERT M. FULDNER.
JOHN M. MORGAN, JR.
JOSEPH A. RAVE, JR.
HERMAN J. BALDWIN.
By Howard S. Kiser
& John F. Verhoeven
ATTORNEYS.

INVENTORS.
HERBERT M. FULDNER.
JOHN M. MORAN, JR.
JOSEPH A. RAVE, JR.
HERMAN J. BALDWIN.
by Howard D. Kiser
& John F. Verhoeven
ATTORNEYS.

July 26, 1960 H. M. FULDNER ET AL 2,946,265

PATTERN CONTROLLED MILLING MACHINE

Filed April 16, 1958 12 Sheets-Sheet 4

INVENTORS.
HERBERT M. FULDNER.
JOHN M. MORGAN, JR.
JOSEPH A. RAVE, JR.
HERMAN J. BALDWIN.
By Howard L. Spicer
& John F. Verhoeven
ATTORNEYS.

July 26, 1960 H. M. FULDNER ET AL 2,946,265

PATTERN CONTROLLED MILLING MACHINE

Filed April 16, 1958 12 Sheets-Sheet 5

INVENTORS.
HERBERT M. FULDNER.
JOHN M. MORGAN, JR.
JOSEPH A. RAVE, JR.
HERMAN J. BALDWIN.
By Howard [signature]
& John F. [signature]
ATTORNEYS.

INVENTORS.
HERBERT M. FULDNER.
JOHN M. MORGAN, JR.
JOSEPH A. RAVE, JR.
HERMAN J. BALDWIN.
By [signature] & John F. Verhoeven
ATTORNEYS.

INVENTORS.
HERBERT M. FULDNER.
JOHN M. MORGAN, JR.
JOSEPH A. RAVE, JR.
HERMAN J. BALDWIN.
By Howard S. Reiser
& John F. Verhoeven
ATTORNEYS.

INVENTORS.
HERBERT M. FULDNER.
JOHN M. MORGAN, JR.
JOSEPH A. RAVE, JR.
HERMAN J. BALDWIN.
By Howard ... & John F. ...
ATTORNEYS.

INVENTORS.
HERBERT M. FULDNER.
JOHN M. MORGAN, JR.
JOSEPH A. RAVE, JR.
HERMAN J. BALDWIN.
By Howard [illegible] + John F. [illegible]
ATTORNEYS.

PATTERN CONTROLLED MILLING MACHINE

Filed April 16, 1958 12 Sheets-Sheet 10

INVENTORS.
HERBERT M. FULDNER.
JOHN M. MORGAN, JR.
JOSEPH A. RAVE, JR.
HERMAN J. BALDWIN.
By Howard Kiser
& John F. Vierhouwer
ATTORNEYS.

INVENTORS.
HERBERT M. FULDNER.
JOHN M. MORGAN, JR.
JOSEPH A. RAVE, JR.
HERMAN J. BALDWIN.
By Howard S. Reiser
John F. Verhoeven
ATTORNEYS.

PATTERN CONTROLLED MILLING MACHINE

Filed April 16, 1958 12 Sheets-Sheet 12

INVENTORS.
HERBERT M. FULDNER.
JOHN M. MORGAN, JR.
JOSEPH A. RAVE, JR.
HERMAN J. BALDWIN.
By Howard Kaiser
& John F. Verhoeven
ATTORNEYS.

United States Patent Office 2,946,265

Patented July 26, 1960

2,946,265

PATTERN CONTROLLED MILLING MACHINE

Herbert M. Fuldner, Fort Thomas, Ky., and John M. Morgan, Jr., Montgomery, and Joseph A. Rave, Jr., and Herman J. Baldwin, Cincinnati, Ohio, assignors to The Cincinnati Milling Machine Co., Cincinnati, Ohio, a corporation of Ohio Filed Apr. 16, 1958, Ser. No. 728,972

11 Claims. (Cl. 90—13.5)

This invention relates to an improved type of pattern controlled milling machine and, more particularly, to a machine which is capable of 360 degree tracing in any one of three mutually perpendicular planes, any one of which may be selected by the operator through suitable manipulation of switches and push buttons provided on the control panel of the machine.

It has been known in the past that tracing of a pattern could be effected in any one of three mutually perpendicular planes by suitable switching of the control circuits so as to select the proper pair of slides for operation under the control of the tracer. One such arrangement is shown in Stephan, U.S. Patent No. 2,718,819, issued September 27, 1955. The construction shown in this patent, however, is limited to 180 degree tracing, i.e., around only one-half of a circle which severely restricts its field of application as a pattern controlled machine since it is often necessary to trace around the entire periphery of a pattern, i.e., through a full 360 degrees. Moreover, the Stephan patent follows the teaching of the Kuehni et al. patent, No. 2,410,295, issued October 29, 1946, in which the control circuits only roughly approximate the formation of sine and cosine components for controlling the movement of the slides.

By following the teachings of the present invention, which will hereinafter be described in considerable detail, it is possible to overcome the above-mentioned limitations of the prior art structures and to provide a tracing apparatus which will provide full 360 degree tracing in any one of three mutually perpendicular planes as well as combination 360 plus depth tracing in one of these planes. Also, true sine and cosine components are produced by the electrical control apparatus of the machine so as to obtain a uniform feed rate in all directions of tracing. Other advantages will also be realized by following the teachings of the present disclosure, such as improved accuracy of tracing, more effective control of the machine by the operator, and greater versatility in operation and performance.

Accordingly, it is an object of the present invention to provide an improved tracing apparatus which is capable of 360 degree tracing in any one of three mutually perpendicular planes.

Another object of the invention is to provide improved control means for effecting 360 degree tracing in any one of three mutually perpendicular planes.

Another object of the invention is to provide an improved tracing head which is capable of providing either a single output signal in response to combined axial and lateral deflections of the tracing finger, or an individual signal for each type of deflection.

Another object of the invention is to provide an improved tracing head in which the amount of deflection of the tracing finger required to move it from a "hang-free" position to a position of normal deflection may be adjusted by rotation of a hand knob on the tracer.

With these and other objects in view, which will become apparent from the following description, the invention includes certain novel features of construction and combinations of parts, the essential elements of which are set forth in the appended claims and a preferred form or embodiment of which will hereinafter be described with reference to the drawings which accompany and form a part of the specification.

Figures 1, 2:
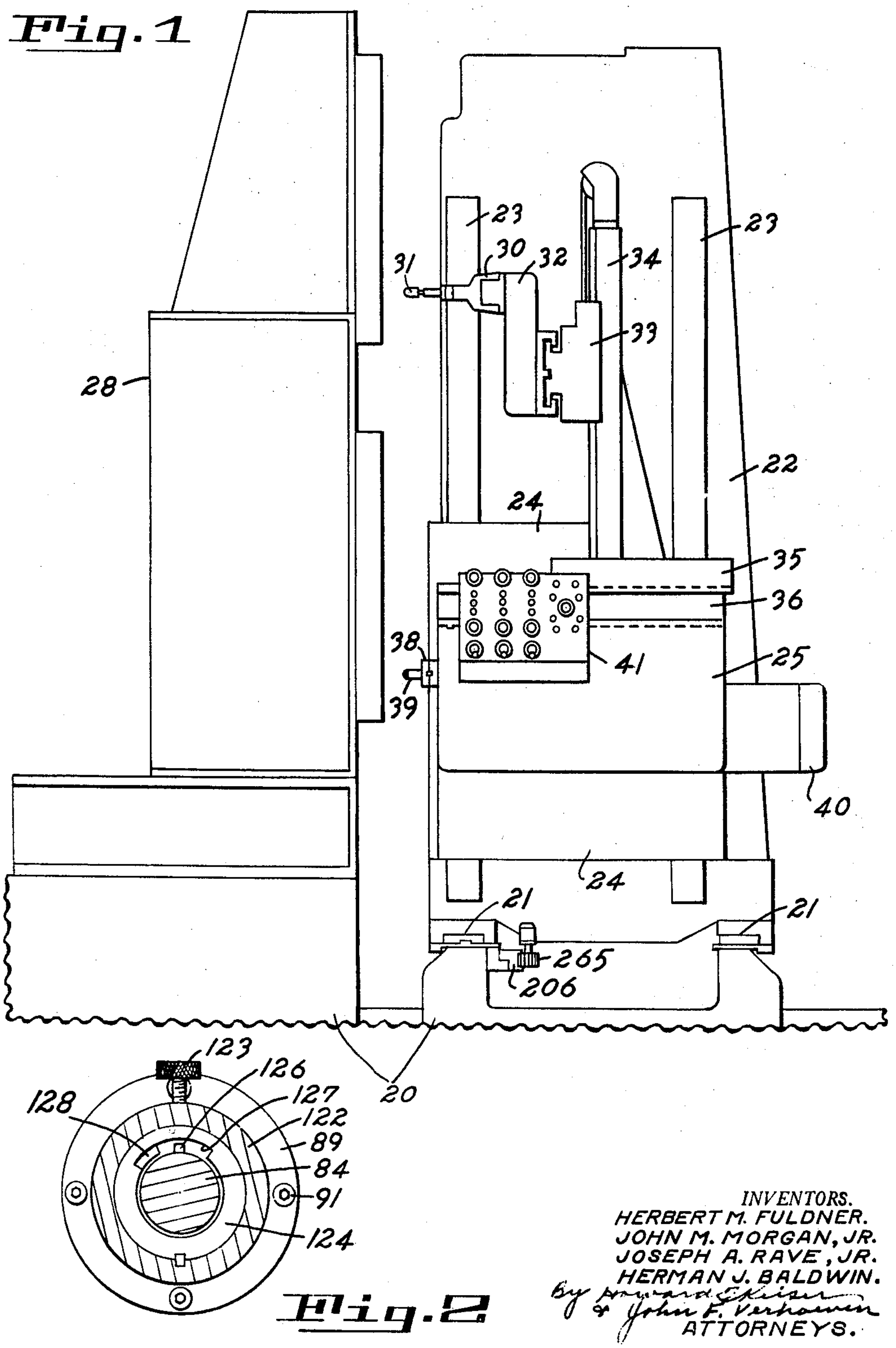
Fig. 1 is a side elevation of a milling machine embodying the present invention.
Fig. 2 is a cross sectional view taken along the line 2—2 of Fig. 6.

Figs. 14*a* to 14*e*, inclusive, constitute a wiring diagram of the electrical control circuits of the machine.

Similar reference characters designate similar or identical elements and portions through the specification and throughout the different views of the drawings.

*General description*

In Figs. 1, 3, 4, and 5, is shown a traveling column type milling machine to which the present invention may be applied in the manner hereinafter described. It is to be realized, of course, that the present invention might equally well be applied to other types of pattern controlled machines incorporating three mutually perpendicular slides by means of which tracing may be effected in any one of three mutually perpendicular planes. The adaptability of the invention to the other types of machines will be more fully understood as the description proceeds.

Figures 3, 4:
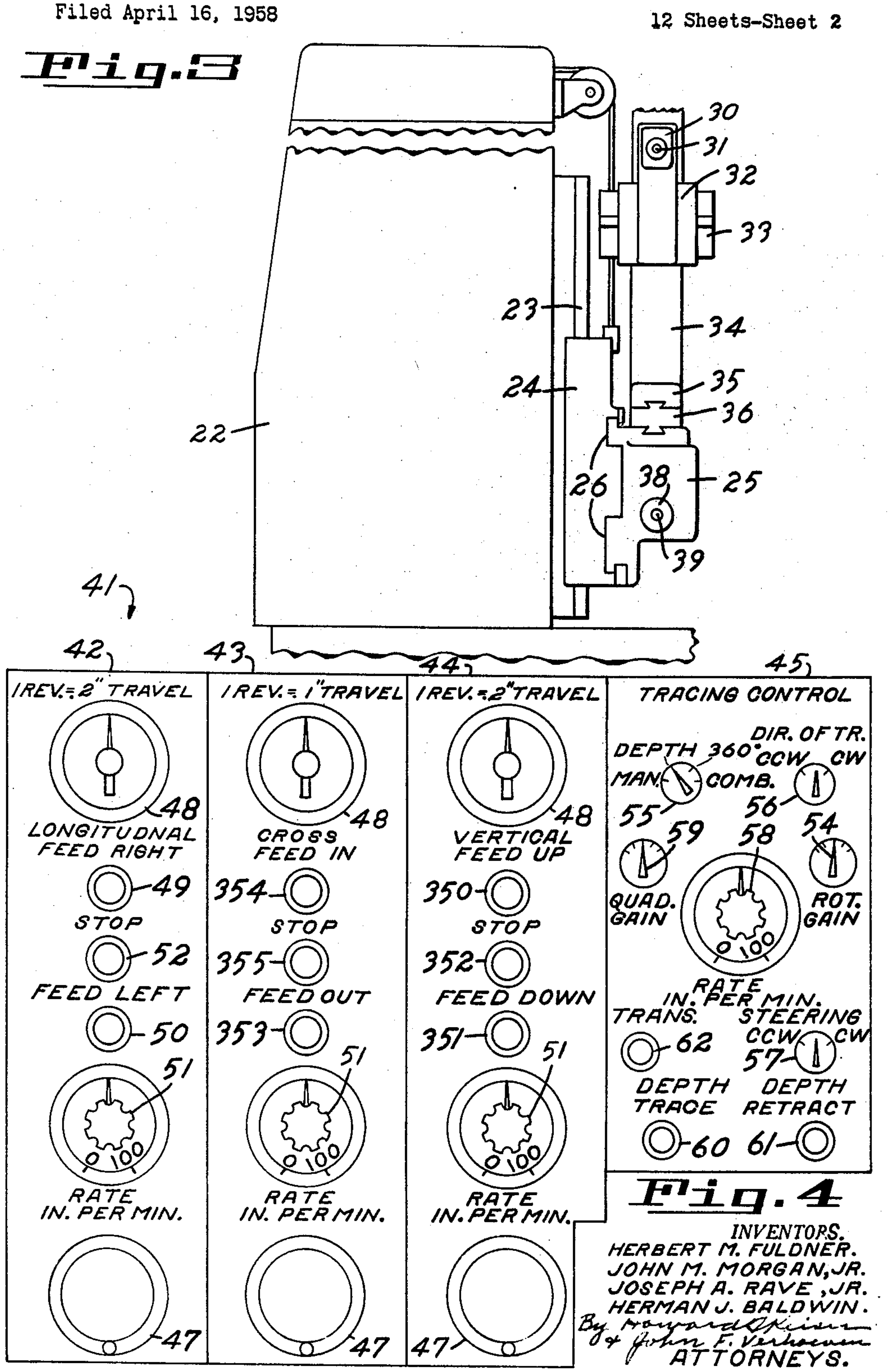
Fig. 3 is a front elevation of a portion of the machine shown in Fig. 1.
Fig. 4 is an enlarged view of the control panel shown in Fig. 1.

The milling machine herein illustrated includes a bed or base 20 which is provided with a pair of longitudinally extending ways 21 on which is supported an upright column 22 for longitudinal sliding movement. The column 22 is provided with a pair of vertically extending ways 23 on which a saddle 24 is mounted for vertical sliding movement on the column. The saddle, in turn, supports a spindle carrier 25 for crosswise movement on ways 26 as shown in Fig. 3.

Mounted on the bed 20 opposite the column 22 and extending in a direction paralleling the ways 21 is a work support 28 to which may be clamped the pattern and the work. Supported on the spindle carrier 25 for movement therewith is a tracing head 30 provided with a tracing finger 31 for following a pattern mounted on the work support 28. The tracing head is secured to a slide 32 which is supported for longitudinal sliding movement on a saddle 33 which, in turn, is supported for vertical sliding movement on a stanchion 34 secured to a slide 35. The latter slide is mounted for crosswise movement on a carrier 36 which, in turn, is mounted for similar movement on the spindle carrier 25. By means of this supporting arrangement of the tracer on the spindle carrier 25, it is possible to adjust the tracing head in any one of three mutually perpendicular directions relative to the spindle for set-up purposes.

The spindle carrier 25 carries a spindle 38 in which is mounted a cutter 39 for operating on the work clamped to the work support 28. A spindle drive motor 40 is mounted on the spindle carrier 25 and is connected to the spindle 38 by the usual variable speed driving mechanism (not shown).

Also mounted on the spindle carrier 25 is a control panel 41 which contains the various hand wheels, dials and push buttons which are necessary in order to control the proper functioning of the machine. Although not shown in the drawings, an operator's platform is customarily provided adjacent the control panel 41 on which the operator can stand and view the action of the cutter on the work as he manipulates the controls on the panel 41. The operator's platform is mounted to move with the spindle carrier so that the controls are always within easy reach of the operator.

As shown in Fig. 4, the control panel is comprised of four subpanels on each of which is grouped the controls for a particular portion of the machine. As shown in Fig. 4, there is provided a subpanel 42 which contains the controls for effecting movement of the longitudinal slide along the ways 21, a subpanel 43 containing the controls for effecting movement of the cross-slide 25, and a subpanel 44 containing the controls for effecting movement of the vertical slide 24. A subpanel 45 is provided on which are grouped the controls which are necessary to effect tracing of a pattern. The subpanels 42, 43, and 44 are each identical insofar as the particular controls provided thereon is concerned. Thus, for example, the subpanel 42 includes a hand wheel 47 for effecting traversing movement of the longitudinal slide. At the top of the panel is provided a dial 48 for indicating the extent of movement of the slide, whether effected by the hand wheel or by the power feed or tracer control circuits. Beneath the dial are two power-feed push buttons 49 and 50 which cause movement of the slide in the appropriate direction at a rate determined by the setting of a rate control knob 51. Power feed movement of the slide will continue until a stop push button 52 is depressed, whereupon the slide is stopped and again placed under the control of the hand wheel 47.

The tracing control subpanel 45 includes a knob 55 for operating a selector switch which determines the type of tracing operation to be performed by the machine. There is also provided a knob 56 for controlling the direction of tracing around a pattern in profiling or 360 degree tracing and a steering control knob 57 which determines the direction of steering of the tracing finger. There is also provided a feed rate knob 58 by means of which any desired feed rate of the tracer along the pattern from zero to a maximum may be selected. Manual control of the quadrature gain and rotation gain of the control circuits may be effected by means of control knobs 59 and 54. Movement of the tracing finger into the pattern in depth tracing is effected by a push button 60 while retraction of the tracing finger from the pattern in depth tracing may be effected by the push button 61. Translation of the tracing finger in the resolver direction is accomplished by depressing push button 62.

These are the essential controls of the machine, and the full meaning and importance thereof will be more readily appreciated when the control circuits of the machine are described hereinafter.

Figure 5:
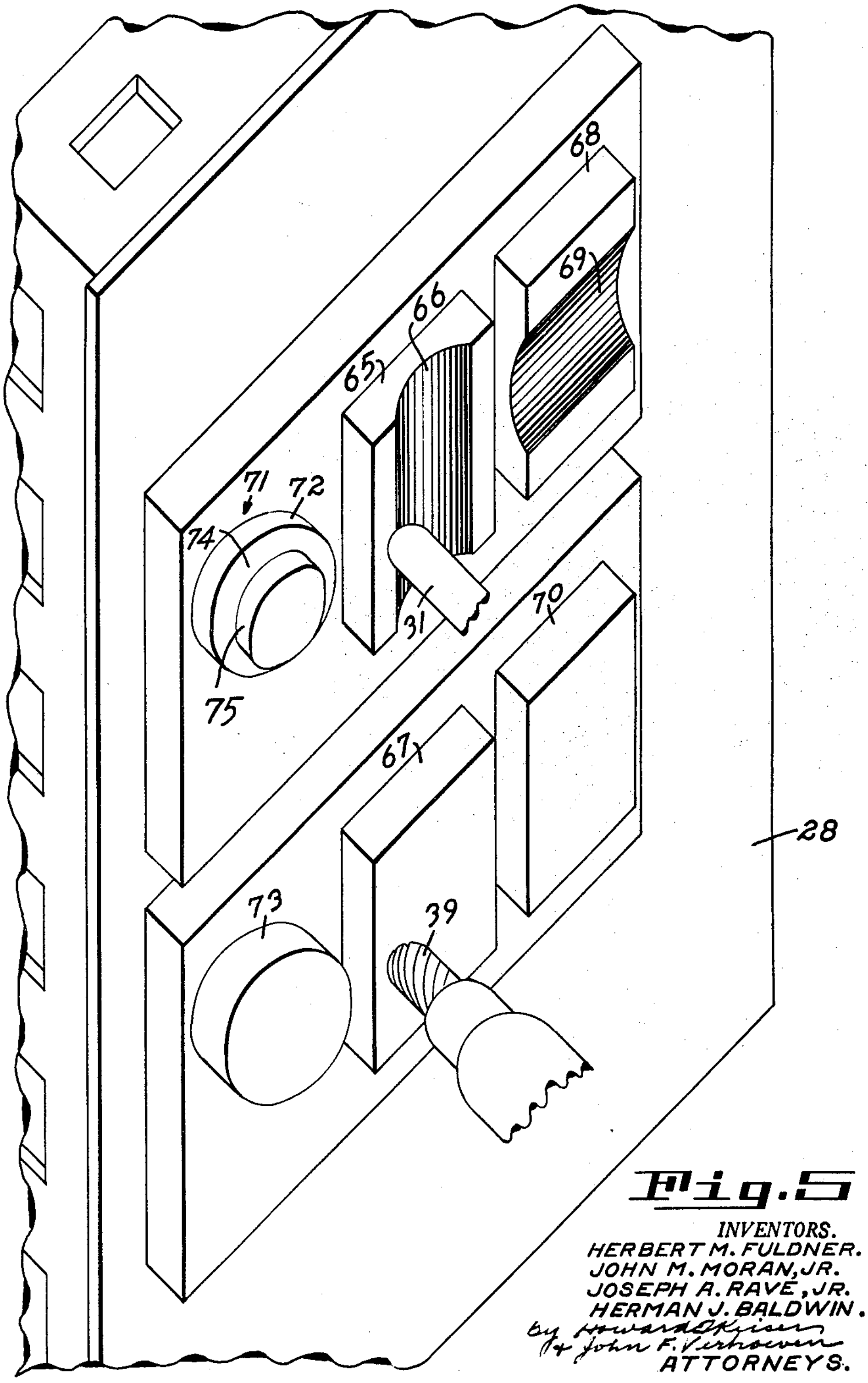
Fig. 5 is a perspective view illustrating the type of work which can be performed by the machine shown in Fig. 1.

The types of tracing operations which may be performed by the machine will be better understood by referring to Fig. 5 of the drawings in which are shown the various types of pattern contours which may be traced by the machine and reproduced in the workpieces by the cutter 39. The machine is, also, of course, capable of performing conventional machining operations under the control of the handwheels 47 (Fig. 4) and the power feed controls provided for each of the slides.

In the upper portion of Fig. 5 are shown three patterns which illustrate the various types of tracing operations which may be performed. In the middle pattern 65 there is provided a vertically extending concavity 66 which may be traced by using the combined movements of the longitudinal slide and the cross slide to cause the tracing finger 31 to follow the contour of the pattern and to effect a corresponding cut in a piece of work 67 mounted on the work support 28 below the pattern. After each pass of the tracer across the pattern and of the cutter across the work, the position of the vertical slide may be adjusted for the next cut by means of the handwheel 47 therefor. The type of tracing employed in connection with the pattern 65 may be conveniently referred to as "depth with longitudinal" tracing and, as will hereinafter be explained, such tracing is effected under the control of a resolver to provide 360 degree tracing of the pattern at a uniform feed rate regardless of changes in the directional heading of the tracer as it moves along the pattern.

To the right of pattern 65 is shown a second pattern 68 which is provided with a longitudinally extending concavity 69 formed therein. Tracing in this case is effected in a vertical plane by the combined movements of the cross slide and the vertical slide and will hereinafter be referred to as "depth with vertical" tracing. Here again, as in the case of the pattern 65, 360 degree tracing of the pattern is provided and movement of the tracing finger at a uniform feed rate along the surface of the pattern is effected under the control of the resolver which steers the finger along the pattern. After each pass of the tracer across the pattern, adjustment of the longitudinal slide may be effected by the hand wheel 47 to prepare the machine for the next pass. In this way, the contour 69 in the pattern 68 will be reproduced in the piece of work 70 mounted directly below the pattern on the work support.

A third pattern 71 will serve to illustrate the profiling or 360 tracing of a pattern as well as the combined 360 plus depth type of tracing. For example, the peripheral surface 72 of the pattern may be followed in either a clockwise or counterclockwise direction by the tracing finger 31 to effect 360 tracing of the pattern and to form a corresponding profile on the work piece 73 mounted below the pattern. The pattern 71 may also include a surface 74 which is of variable depth and which terminates in a peripheral contour 75 of irregular shape. The surfaces 74 and 75 may be simultaneously machined by use of 360 plus depth tracing, the surface 74 being followed by the depth control for in and out movements of the cross slide, while the surface 75 is followed by the combined movements of the longitudinal and vertical slides. In the profiling of the peripheral surfaces 72 and 75, the movements of the vertical and longitudinal slides are simultaneously controlled to effect 360 tracing of the surfaces with a uniform feed rate in all directions of tracing. The tracing feed rate may be varied as desired by the control knob 58 (Fig. 4).

*Tracing head*

Figures 6, 7, 8:
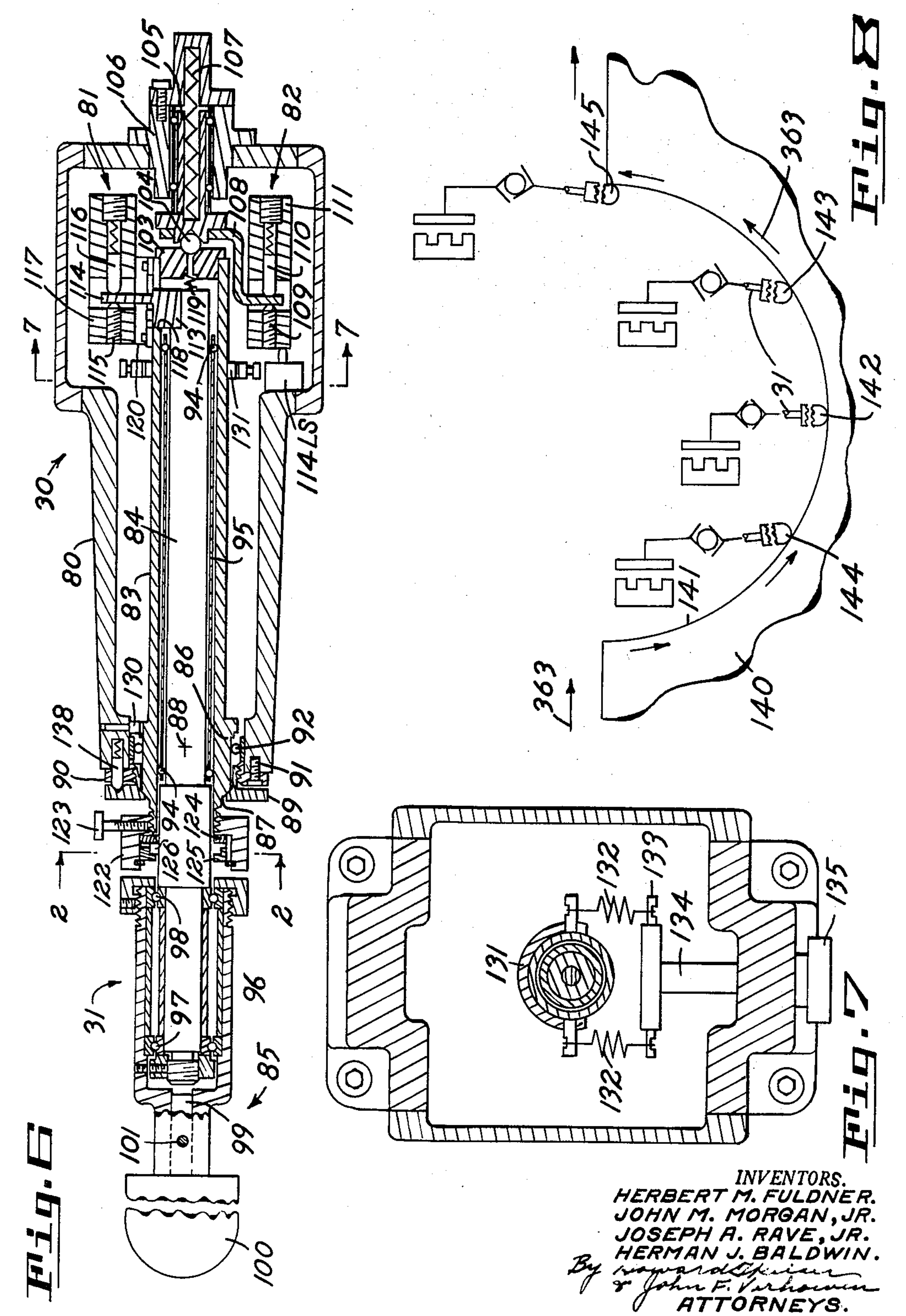
Fig. 6 is a longitudinal cross sectional view of the tracing head shown in Fig. 1.
Fig. 7 is a cross sectional view taken along the line 7—7 in Fig. 6 and rotated 90 degrees.
Fig. 8 is a schematic view illustrating the action of the tracer under combined axial and lateral deflecting forces acting on the tracing finger.

The tracing head 30 illustrated in Fig. 1 is shown in greater detail in Fig. 6 of the drawings. As therein shown, the tracing head includes a housing 80 which is enlarged at one end to receive the differential transformers which form the signal producing means of the tracing head. In the device herein illustrated, there are two such differential transformers, a depth or "180" transformer 81 and a "360" transformer 82. The other end of the housing 80 is of reduced size and forms a shank portion in which is supported a tracing finger 31. The tracing finger includes a sleeve 83 which is housed in the shank portion, a stem 84 which is slidably received within the sleeve, and a stylus portion 85 mounted on the end of the stem. To support the sleeve 83 for universal tilting movement in the shank portion of the housing 80, the sleeve is provided at its left hand end with a portion 86 of enlarged diameter on which is formed a spherical surface 87 which conforms to the surface of a sphere having its center located at the point indicated by reference numeral 88. The surface 87 rests upon a seat of corresponding configuration and bearing the same reference numeral provided in an apertured bushing 89 having external screw threads thereon which are received by the internal threads provided in a retaining cap 90. This cap is secured to the end of the housing 80 by screws 91. The cap 90 thereby provides a means for supporting the bushing on the end of the housing and also functions as a retainer for a radial ball bearing 92 which fits between the enlarged portion 86 on the sleeve and the inner surface of the housing 80. The sleeve 83 is thereby supported for universal pivoting movement about the center 88 and also for longitudinal sliding movement by means of bearing 92 in which case the sleeve lifts off its seat 87.

The stem 84 is supported for axial sliding movement within the sleeve by means of ball bearings 94 which are interposed between the stem and the inner surface of the sleeve and are held in position by a retainer sleeve 95. At its left hand end the stem projects outwardly from the sleeve 83 to form the stylus portion of the tracing finger. This portion includes a bearing sleeve 96 which is journaled for rotation on the end of the stem by ball bearings 97 and 98. The distal end of the sleeve is apertured to receive a shank 99 formed on a contact roll 100. A set screw 101 is provided to secure the contact roll to the sleeve 96.

At its right hand end the sleeve 83 is closed by a plug 103 in which is formed a conical seat for a ball 104. Disposed in axial alignment with the sleeve 83 is a plunger 105 also formed with a conical seat for receiving the ball 104. The plunger 105 is journaled for sliding movement in a bore provided in a bushing 106 fitted in the right hand end of the housing. A spring 107 urges the plunger 105 toward the left to resiliently urge the sleeve 83 into contact with the seat 87. The plunger is fitted with a finger 108 which has an offset portion received between a set screw 109 and a spring pressed plunger 110 carried by a block 111 secured to the armature of the differential transformer 82. Hence, either tilting or axial sliding movement of the sleeve 83 will displace the plunger 105 to the right as viewed in Fig. 6, thereby shifting the armature of the differential transformer 82 also to the right toward its null position.

On the right hand end of the stem 84 is secured a block 113 which is formed with a laterally projecting finger 114 that is received between a set screw 115 and a spring pressed plunger 116 carried by the block 117 which is secured to the armature of the differential transformer 81. The right hand end of the sleeve 83 is slotted to accommodate the block 113, the end of the slot forming a shoulder 118 which limits movement of the block 113 to the left. The block 113 is held in the position shown in Fig. 6 by a spring 119 compressed between the end of stem 84 and the plug 103. The spring 119 is somewhat weaker than the spring 107 so that when axial pressure is applied against the end of roll 100 the stem 84 will be moved to the right against the pressure of spring 119 and the finger 114 will move the armature of transformer 81 to the right toward its null position.

In depth tracing as well as in 360 tracing it is desirable to lock the stem 84 to the sleeve 83 thereby disabling depth transformer 81, which is carried by a bracket 120 secured to the sleeve 83, and causing the 360 transformer 82, which is fastened to the housing 80, to respond to both axial and lateral displacements of the tracing finger. For this purpose, a knurled collar 122 is adapted to be screwed onto the threaded end of the sleeve 83. A thumb screw 123 in the collar may be tightened to prevent rotation of the collar on the end of the sleeve. Mounted within the collar are a pair of spaced washers 124 and 125 (see also Fig. 2) which lie on either side of a pin 126 projecting radially from the stem 84. The washers are keyed to the collar 122 and are provided with aligned notches 127 (Fig. 2) which are of considerably greater width than the pin and which will permit free movement of the pin therethrough when the collar 122 is in the position shown in Fig. 2. When it is desired to lock the stem to the sleeve, the thumb screw 123 is loosened and the collar is turned clockwise as viewed in Fig. 2 to cause the pin 126 to be seized between cam portions 128 formed on the sides of washers 124 and 125 adjacent the left hand edges of the slots 127 as viewed in Fig. 2. The thumb screw 123 is then tightened to prevent rotation of the collar on the sleeve to hold the parts in locked position.

It is to be noted that the stem 84 is held against rotation with respect to the sleeve 83 by the slot provided in the right hand end of the sleeve to receive the block 113. Likewise, the sleeve 83 is held against rotation within the housing 80 by means of a headed pin 130 secured in the housing which is received in an axially extending groove formed in the enlarged portion 86 of the sleeve.

Inasmuch as the tracing head is normally supported in a horizontal position as shown in Fig. 1, and since the portion of the tracing finger extending to the left beyond the housing is normally heavier than the portion within the housing, it is desirable to counterbalance the finger to avoid lateral deflection thereof due to the unbalanced weight. For this purpose, a yoke 131 is fitted over the sleeve as shown in Fig. 7 and is urged downwardly by a pair of springs 132 secured to a cross arm 133 carried by a stem 134. The other end of the stem is threaded and receives and adjusting knob 135 by means of which the tension on the springs 132 may be increased or decreased as may be necessary to bring the tracing finger into balance.

When the tracing finger is in the "hang-free" position, i.e., when the ball 104 is seated in the conical recesses as shown in Fig. 6, and the block 113 is against the shoulder 118 on the sleeve 83, both differential transformers 81 and 82 are in an underdeflected condition. A certain amount of right hand movement of the fingers 108 and 114 is necessary in order to move the armatures of the transformers to their null positions. The amount of movement required for this purpose depends upon the setting of the set screws 109 and 115. For reasons hereinafter to be explained, it is desirable to increase or decrease the movement required to bring the transformer 82 into a balanced or null condition. This could, of course, be done by making suitable adjustment of the set screw 109, but this would be a difficult and time-consuming operation. To simplify this adjustment, means have been provided for adjusting the seat 87 in the knurled bushing 89 in the longitudinal direction of the tracing finger. Thus, by rotating the bushing 89 on the threads in the cap 90, the seat 87 may be moved in the axial direction of the tracing finger and thereby adjust the hang-free position of the finger. A spring-pressed plunger 138 in the bottom of the housing is adapted to engage with a series of notches formed in the right hand face of the bushing 89 to hold the same in adjusted position. Suitable indicia may be provided for indicating in thousandths of an inch the amount of hang-free in the finger, i.e., the number of thousandths which the finger 108 must move in order to bring the transformer armature to its null position.

In 360 tracing around the profile of a pattern, and particularly in 360 tracing of inside profiles, it is desirable to have as much hang-free as possible to provide for a substantial amount of anticipation of square corners or similar abrupt changes in direction of the pattern outline. In 360 depth tracing, however, it is desirable to have only a small amount of hang-free due to the changeover of the tracing finger from axial deflection to lateral deflection, or vice versa, which may cause a rough or uneven surface to be produced on the work if the hang-free is large.

For a better understanding of this problem, reference is made to Fig. 8 of the drawings where there is shown a pattern 140 having a concavity 141 therein which is to be traced in 360 depth tracing. Assuming that the tracing finger 31 is in the position indicated by the reference numeral 142 and the direction of tracing is to the right as viewed in this figure, the lateral deflection on the tracing finger is negligible and the sleeve 83 will be in its centered position with respect to ball 104 and plunger 105. Assuming that the sleeve and stem 84 are locked together, the sleeve will be lifted off its seat 87 by axial pressure on the tracing finger to provide the amount of displacement of the finger 108 required to move the armature of the transformer 82 to its null position. If the hang-free of the tracing finger is large, the displacement will be correspondingly large. As the tracing finger continues to move to the right, a position such as that indicated by reference numeral 143 will eventually be reached where the lateral or sidewise thrust on the tracing finger by the pattern will be sufficient to tilt the sleeve 83. When this occurs, the mechanics of the tracing finger structure are such that the finger will drop back on its seat 87. If the hang-free is large, the tilt of the finger at this time will not be large enough to hold the armature of transformer 82 in its null position and an underdeflected signal will be transmitted by the transformer. This will cause the slides to move the tracing finger and cutter in a direction normal to the surface 141 and toward the same to correct the error. This is caused by the quadrature voltage which will be explained hereinafter in connection with the tracing control circuits. The resultant movement of the cutter into the work produces a step or ridge therein and impairs the surface finish. This result may be avoided by reducing the hang-free so that the drop of the tracing finger onto the seat 87 will be small and will not exceed the displacement of the finger 108 produced by the tilt of the sleeve.

If the hang-free is large, a similar difficulty will be experienced when the finger changes over from lateral deflection to axial deflection. Thus, when the finger is in the position indicated by reference numeral 144, and moving to the right, a position will eventually be reached where the sleeve 83 will straighten up and assume the position shown in Fig. 6 at which time the axial displacement of the finger will be insufficient to displace the armature of transformer 82 to its null position. An underdeflected signal will result, and the quadrature voltage will move the slides in a direction to move the finger and cutter at right angles to surface 141, thereby causing the cutter to dig into the work and form a ridge or rough spot thereon. When the tracing finger is rounding the corner at the right hand end of the concavity 141, which position is indicated by reference numeral 145, it will be seen that similar considerations apply, and undercutting of the work will result. Hence, it is important for the purpose of the present invention in which large hang-free is desirable in 360 tracing operations, and small hang-free is desirable in depth tracing operations to provide the adjustment hereinbefore described for enabling the operator to quickly and easily adjust the amount of hang-free of the tracing finger.

*Hydraulic circuit*

Figure 9:
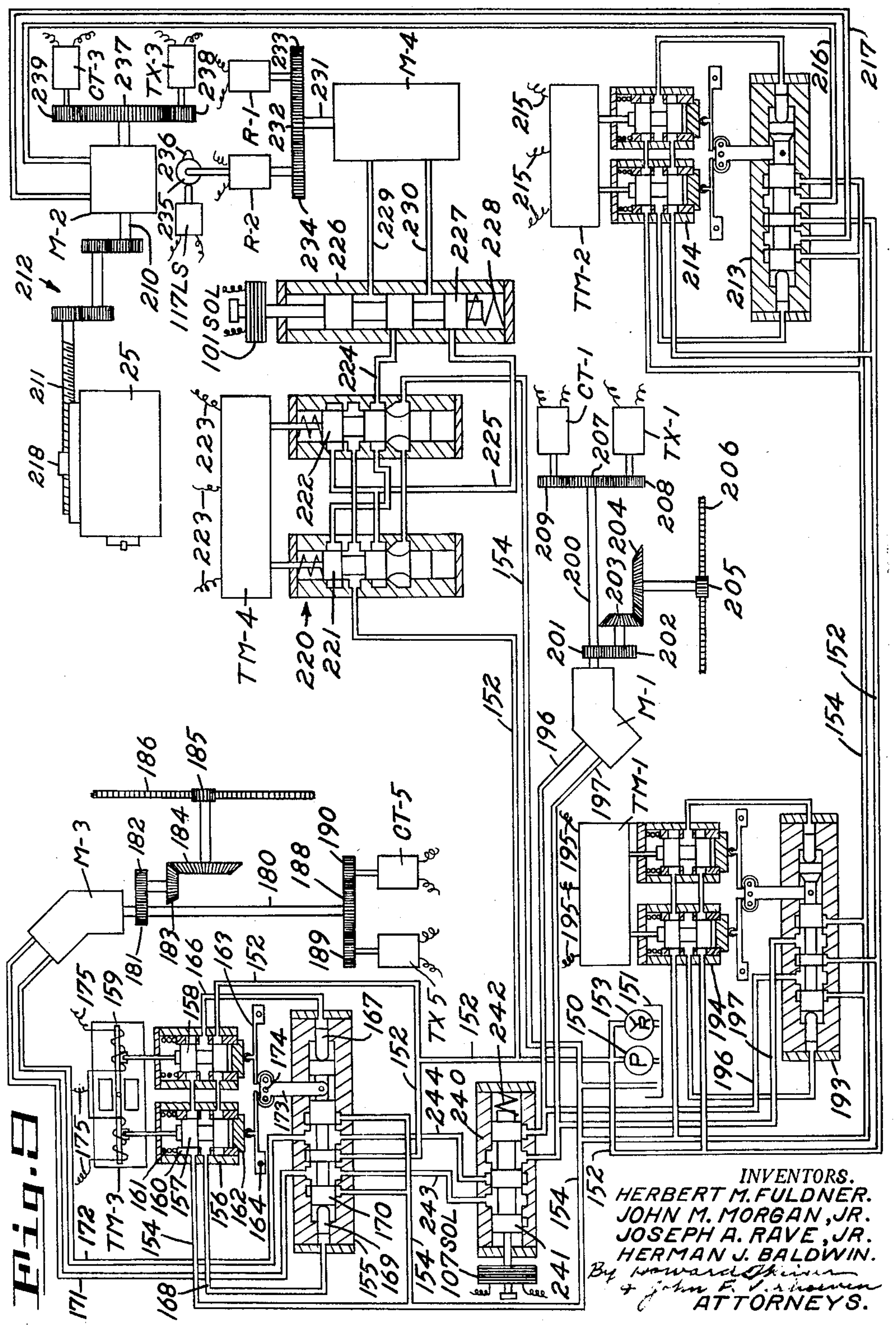
Fig. 9 is a simplified hydraulic diagram of the machine shown in Fig. 1.

The essential features of the hydraulic circuit incorporated in the machine tool is illustrated in Fig. 9 of the drawings. The longitudinal, cross, and vertical slides of the machine tool are actuated by hydraulic servo-motors M–1, M–2, and M–3, respectively, which are connected by suitable drive mechanism with their respective slides. Hydraulic pressure for operating the motors is provided by a pump 150 which withdraws hydraulic fluid from a sump 151 and delivers it to a pressure line 152. The pressure in line 152 is maintained constant by a relief valve 153 which is connected to the pressure line and serves to by-pass fluid from the pressure line to the sump 151 whenever the pressure exceeds the setting of the relief valve. After passing through the valves and motors of the system, the hydraulic fluid is returned to the sump 151 through a return line 154. Inasmuch as the valves utilized for controlling the operations of the motors M–1, M–2, and M–3 are of similar construction, only one of these, namely that for controlling the vertical slide motor M–3 will be described in detail.

Control of the motor M–3 is effected by a servo-valve 155 which is adapted to be operated by a pilot valve 156. The latter valve is provided with two spools 157 and 158 which are pivotally connected to an armature 159 of a torque motor TM–3. The torque motor is of well-known construction and may, for example, be of the type disclosed in the Mason et al. Patent No. 2,674,099, issued April 6, 1954. The armature 159 is supported for pivotal movement about its center and, since the spools 157 and 158 are connected thereto on opposite sides of the pivot, these spools will move in opposite directions upon tilting movements of the armature. Each spool is slidably received within a ported bushing 160, which, in turn, is slidable within the body of the valve. Each bushing 160 is biased downwardly by a spring 161 to press a closure plug 162 in the bottom of the bushing against a nose formed on an operating lever 163 pivoted at 164. Hydraulic fluid under pressure is supplied to the bottom set of ports through the pressure line 152 while the upper set of ports is connected to the return line 154. The intermediate set of ports associated with the plunger 158 is connected by a line 166 to an operating plunger 167 for the servo valve 155, while the intermediate set of ports associated with the plunger 157 is connected by a line 168 with an operating plunger 169 located at the opposite end of the servo valve. The plungers 167 and 169 bear against opposite ends of a spool 170 in the servo valve and provide means for shifting this spool under the control of the torque motor TM–3. The central port of the servo valve 155 is connected to the pressure line 152 while the outermost ports of the valve are connected to the return line 154. The intermediate ports of the servo valve are connected by lines 171 and 172 to the motor M–3. The spool 170 is operatively connected with the lower end of a lever 173 pivoted at 174 and having oppositely disposed arms, each carrying a roller which lies beneath the outer end of one of the levers 163. The arm 173, levers 163 and bushings 160 provide a follow-up device whereby the servo valve spool 170 will at all times follow the movement of the spools of the pilot valve. For example, if the current delivered through conductors 175 to the torque motor TM–3 is such as to bias the armature 159 in a direction to lower the spool 157 and raise the spool 158, pressure will be applied behind plunger 169 and move the spool 170 to the right. The arm 173 will thereby be rotated counterclockwise so as to lower the left hand sleeve 160 and elevate the right hand sleeve 160. Hence, the sleeves will follow up the movement of the spools 157 and 158, and stop further movement of the spool 170. When the current flowing through the coils of the torque motor again becomes equal, thereby centering the armature 159, the action will be reversed and the spool of the servo valve will return to its centered position. Hence, depending upon which way the armature 159 of the torque motor is biased, the hydraulic servo motor M–3 will be caused to run in one direction or another and at a speed proportional to the amount of bias applied to the torque motor.

The servo motor M–3 drives a shaft 180 to which is secured a spur gear 181. Meshing with this gear is a second spur gear 182 which drives a bevel gear 183 meshing with a companion bevel gear 184. The bevel gear 184 drives a pinion 185 which meshes with a vertical rack 186 secured to the column 22 (Fig. 1) of the machine tool. Inasmuch as the motor M–3 and gearing 181—185 are supported upon and move with the saddle 24, it will be seen that the vertical movement of the saddle along the ways 23 will be controlled by the current applied to the torque motor TM–3.

Also secured to the shaft 180 of the servo motor is a gear 188 which drives a pair of similar gears 189 and 190. The gear 189 is secured to the shaft of a synchro transmitter TX–5 while the gear 190 is secured to a shaft of a control transformer CT–5. These synchros will thereby be driven in synchronism with the movement of the saddle 24 for a purpose hereinafter to be described.

In a similar manner, the hydraulic servo motor M–1 for the longitudinal slide is controlled by a servo valve 193 which, in turn, is controlled by a pilot valve 194. The spools of the pilot valve 194 are operated by a torque motor TM–1 having operating coils which are supplied with current through conductors 195. When the spools of the pilot valve are moved away from their neutral positions, the spool of the servo valve 193 will be shifted in one direction or the other to deliver hydraulic fluid to the servo motor through motor lines 196 and 197. The servomotor drives a shaft 200 to which is fixed a spur gear 201 that meshes with a second spur gear 202. This gear drives a bevel gear 203 which, in turn, drives a bevel gear 204 and thereby a pinion 205 meshing with a horizontal rack 206 (see also Fig. 1) affixed to the bed 20 of the machine tool. Since the motor M–1 and the gearing 201—205 is carried by the column 22, operation of the motor will drive the column along the ways 21 in a direction dictated by the flow of current to the torque motor TM–1.

Also, fast on the shaft 200 is a gear 207 which drives a pair of similar gears 208 and 209. The gear 208 is secured to the shaft of a synchro transmitter TX–1, while the gear 209 is fast on the shaft of a control transformer CT–1. Therefore, the synchros will be caused to rotate in synchronism with the movement of the column 22 along the bed.

The operation of hydraulic servomotor M–2 for the cross slide is controlled by a servo valve 213 which, in turn, is controlled by a pilot valve 214. The spools of the pilot valve are operated by a torque motor TM–2 to which current is supplied through conductors 215. When the flow of current to the operating coils of the torque motor through conductors 215 is unbalanced, the spools of the pilot valve will be shifted, thereby displacing the spool of the servo valve 213 from its neutral position. Hydraulic fluid will thereby be caused to flow through the motor lines 216 and 217 leading to the hydraulic servomotor M–2 and cause the motor to run in a direction and at a speed corresponding to the bias applied by the torque motor to the spools of the pilot valve. The servo motor drives a shaft 210 which drives a lead screw 211 through a gear train 212. This lead screw meshes with a nut 218 carried by the spindle carrier 25 which is thereby moved in or out on the saddle 24 thereby effecting in or out movement of the cutting tool and tracer.

Secured to the opposite end of the motor shaft 210 is a spur gear 237 which meshes with a pair of similar spur gears 238 and 239 which serve to drive a synchro transmitter TX–3 and a control transformer CT–3 in synchronism with the movement of the spindle carrier 25.

In certain instances it is desirable to prevent movement of the longitudinal and vertical slides, and for this purpose a shorting valve 240 is provided. This valve is fitted with a spool 241 which is urged to the left by a compression spring 242 so as to maintain the valve in an inoperative condition. However, when a solenoid 107SOL is energized, the spool 241 will be moved to the right against the force of spring 242 thereby shorting the lines 196 and 197 leading to the motor M–1 for the longitudinal slide. Movement of the spool to the right will also short a pair of lines 243 and 244 connected to the motor ports of the servo valve 155. This valve, it will be recalled, controls the flow of fluid to the servo motor M–3 for the vertical slide so that energization of solenoid 107SOL will short the motor lines to both the longitudinal and vertical slide motors and thereby prevent movement of these slides.

The present system includes a further valve 220 which includes a pair of spools 221 and 222 which, like the spools of the previously described pilot valves, are moved in opposite directions by the armature of a torque motor TM–4. The coils of the torque motor are provided with conductors 223 by means of which current may be supplied to the coils of the motor. Thus, when an unbalanced current is supplied to the coils of the torque motor, the plungers 221 and 222 will move in opposite directions and connect motor line 224 with the pressure line 152 and motor line 225 with the return line 154 or vice versa. The motor lines are connected through a blocking valve 226 with conduits 229 and 230 leading to the inlet ports of a hydraulic servo motor M–4. The valve 226 contains a spool 227 which is normally held in blocking position by means of a compression spring 228. However, when a solenoid 101SOL is eneregized, the spool will be moved downwardly against the urgency of the spring 228 and connect lines 224 and 229 and also lines 225 and 230, thereby conditioning the servomotor for operation under the control of the valve 220.

The servomotor M–4 has an output shaft 231 to which is fixed a spur gear 232. Meshing with this gear are two similar gears 233 and 234 which drive the rotors of resolvers R–1 and R–2, respectively. The purpose of these resolvers and the connections thereto will be described hereinafter in connection with the electric tracer control apparatus. It will be noted, however, from the hydraulic diagram, that the shaft of resolver R–2 has mounted thereon a cam 235 bearing a lobe 236 which is adapted to actuate the plunger of a limit switch 117LS in one particular position of the shaft. The purpose of this cam and limit switch will be explained hereinafter in connection with the electrical wiring diagrams.

*Servo system*

Figures 10, 11:
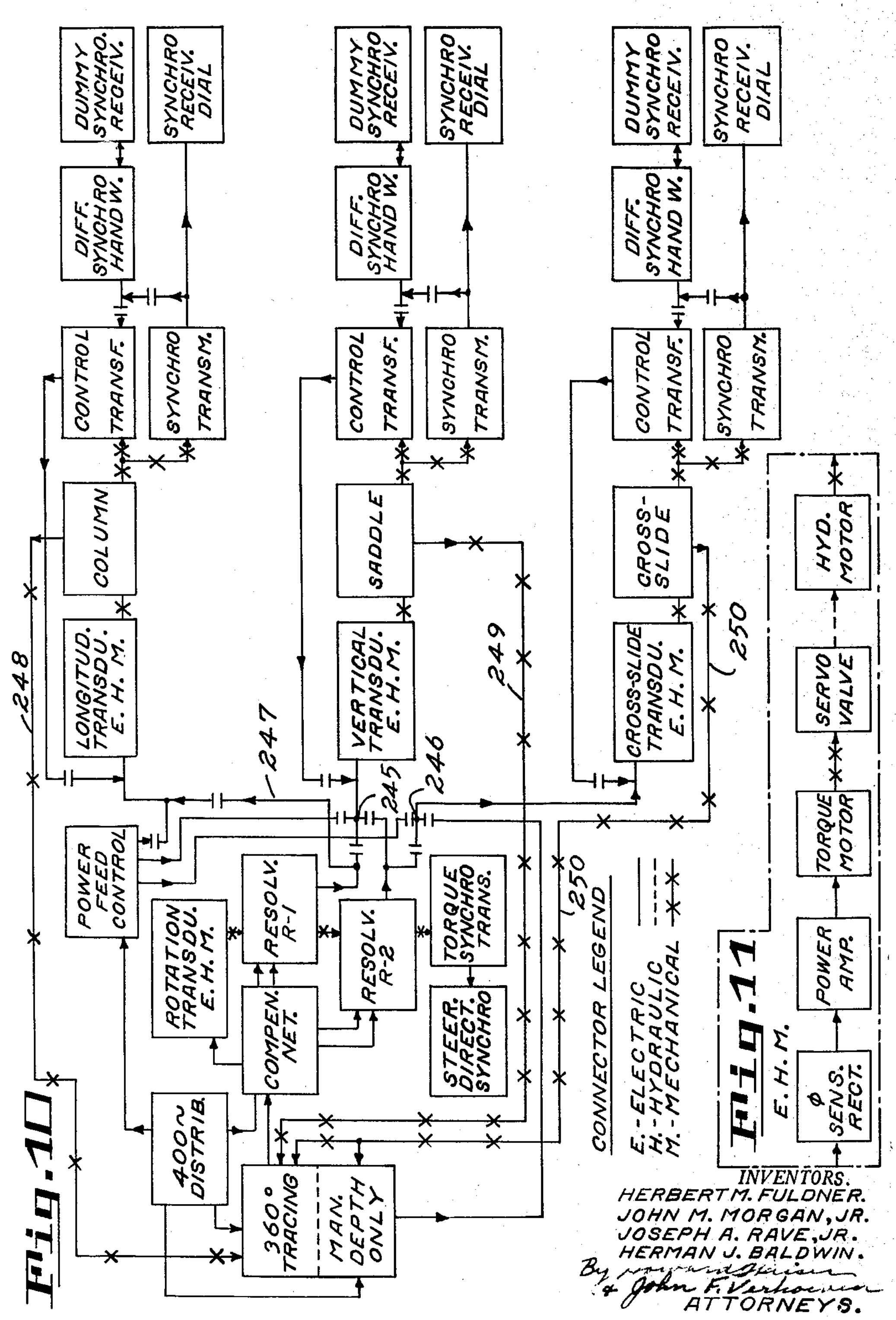
Fig. 10 is a block diagram illustrating the tracing system employed in the machine shown in Fig. 1.
Fig. 11 is a block diagram showing the components incorporated in the electro-hydraulic servomechanisms shown in Fig. 10.

A block diagram of the servo system of the machine tool is shown in Fig. 10 of the drawings. In this diagram the tracing head is indicated at the left hand side of the figure. The two resolvers utilized for steering a selected pair of slides are indicated to the right of the tracing head, and the column, saddle and cross slide, together with their associated servo mechanisms (E.H.M.), are indicated in the center of the diagram. Each slide has associated therewith a hand servo control apparatus indicated at the right hand side of the diagram.

As indicated in the left hand portion of the diagram, the signals from the 360 transformer in the tracing head are delivered to a compensating network and then to resolvers R–1 and R–2 along with a feed rate signal from the 400 cycle distributor. By means of suitable relay contacts, the signals from the resolvers may be applied through junctions 245 and 246 and a lead 247 to the servo mechanisms controlling the column, saddle, and cross slide. Alternatively, a power feed rate signal may be delivered to a selected slide from the power feed control circuit.

The blocks on the diagram bearing the designation E.H.M. represent servo mechanisms comprised of electrical, hydraulic, and mechanical components. A block diagram of each of these servo mechanisms is shown in Fig. 11 in order to more completely explain the make-up of the four servo mechanisms involved in the system. The rotation servo mechanism, indicated in the upper left hand portion of the diagram, receives the error signal from the 360 transformer in the tracing head and mechanically drives resolvers R–1 and R–2 to correct the steering of the slides in accordance with the signal received from the tracing head.

The hand servo control apparatus for each of the slides includes five synchros including a differential synchro operated by the hand wheel 47 for that particular slide and a control transformer for transmitting signals to the input of the servo mechanism for the slide to cause the slide to follow the movements of the hand wheel. When the hand wheel for a particular slide is disconnected and the slide is moved under tracer or power control, a dummy synchro receiver follows the movement of the slide and prevents jumping of the slide when the hand wheel is re-engaged. The synchro receiver operating the dial is operated by a synchro transmitter which has a mechanical driving connection with the slide so that the dial will at all times indicate the position of the slide.

The mechanical feedback from each of the slides to the tracing head is indicated by the mechanical connections 248, 249, and 250.

The orientation of the resolvers at any particular instant is indicated by a steering director synchro which is driven by a torque synchro transmitter which has a mechanical driving connection with the resolver rotors which themselves are mechanically coupled together as herein indicated.

Figure 12:
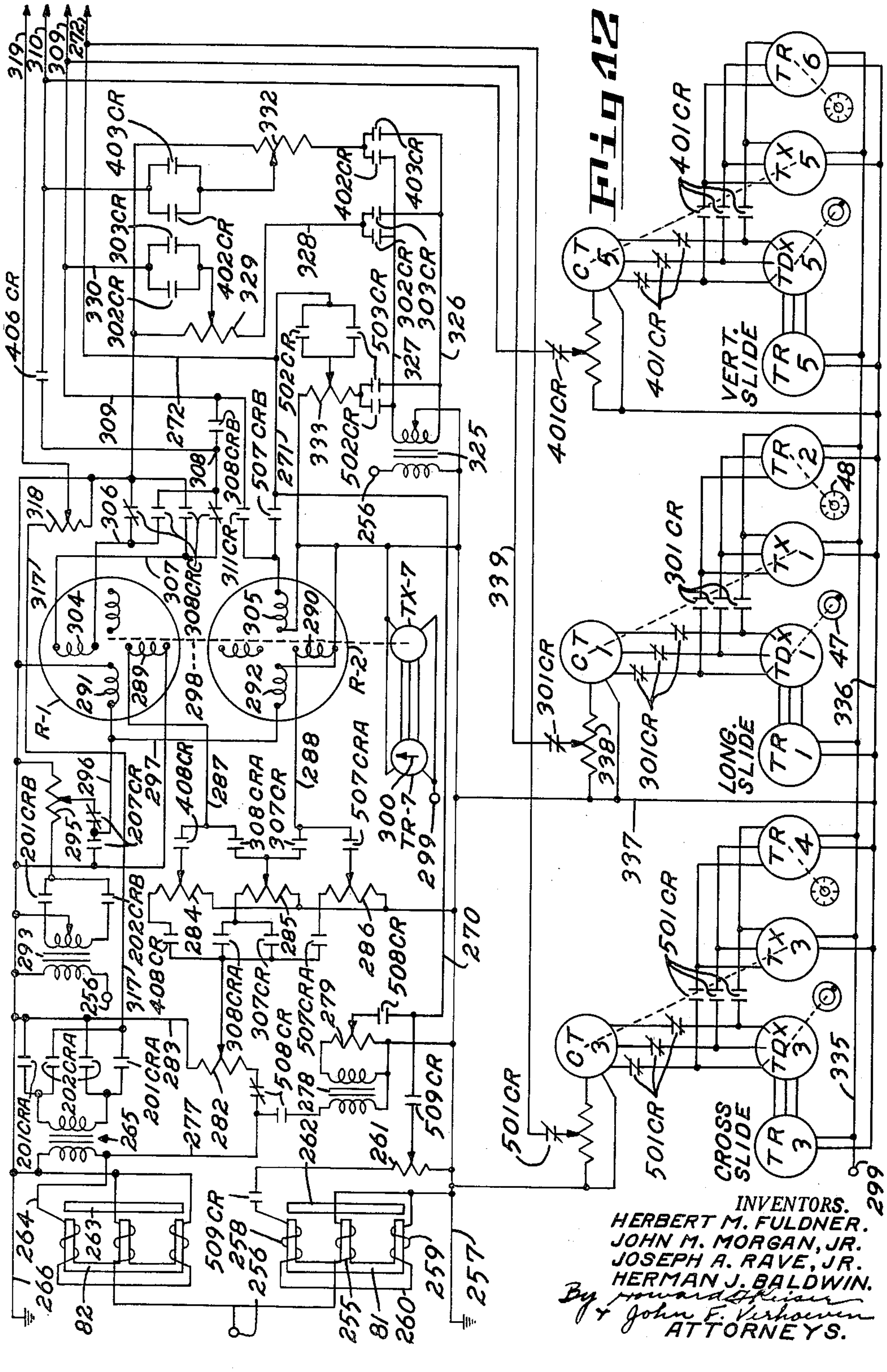
Fig. 12 is part of a wiring diagram of the tracer and hand servo controls of the machine.
Figure 13:
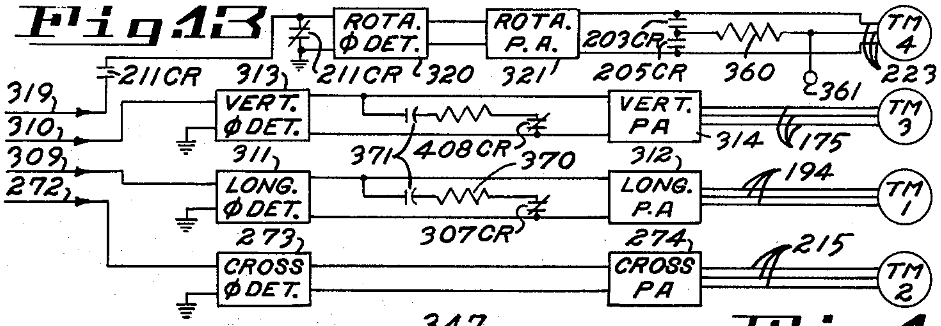
Fig. 13 is a continuation of the wiring diagram shown in Fig. 12.

The servo system shown in Figs. 10 and 11 is more explicitly delineated by the wiring diagram shown in Figs. 12 and 13. In the upper left hand portion of Fig. 12 are shown the differential transformers 81 and 82 previously described in connection with the tracing head shown in Fig. 6. Since the transformers are of similar construction, a detailed description of transformer 81 will suffice for both. As shown, the transformer 81 includes an E-shaped core on the center leg of which is wound a primary winding 255, one terminal of which is connected to a source of 400 cycle alternating current, indicated by reference numeral 256, while the other terminal is connected to a ground lead 257. The secondary windings 258 and 259 of the transformer mounted on the outer legs of the core are connected in phase opposition through a lead 260. The other end of winding 259 is connected to ground while the remaining terminal of winding 258 is connected through the normally open contacts of a relay 509CR to the upper end of a potentiometer 261, the lower end of which is connected to ground. Hence, when the armature 262 of the transformer 81 is centered, as shown in Fig. 12, the voltages induced in the secondary windings 258 and 259 will be equal and opposite so that the output applied to the potentiometer 261 will be zero. However, movement of the armature either up or down as viewed in Fig. 12 will change the coupling between the primary and secondary windings and cause an output signal to appear across the potentiometer 261 which is either in phase or out of phase with the source 256 depending upon the direction of motion of the armature.

In a like manner, when armature 263 of differential transformer 82 is moved away from its centered position as shown in Fig. 12, an output signal will appear in the lead 264 and will be applied to the primary winding of a transformer 265. The primary and secondary windings of the transformer 82, and also the primary winding of a transformer 265, are connected to ground through a ground lead 266.

When the two pairs of normally open relay contacts 509CR shown in Fig. 12 are closed, output from depth transformer 81 will be connected across the potentiometer 261, and the slider of this potentiometer will be connected to a line 270 which, in turn, is connected by a line 271, with a line 272 which constitutes the input lead to the cross slide servo amplifier as shown in Fig. 13. The servo amplifier includes a phase detector 273 which supplies a small D.C. signal to a power amplifier 274 where the signal is amplified and transmitted by leads 215 (see also Fig. 9) to the torque motor TM–2 which controls movements of the cross slide 25. Accordingly, when the stem 84 (Fig. 6) is disconnected from sleeve 83 and permitted to move axially for straight depth tracing, the signal provided by depth transformer 81 will cause the cross slide to follow the outline of the pattern as the tracer is moved therealong by operation of one of the remaining slides.

The output lead 264 of transformer 82 is connected by a line 277 and the normally open contacts of a relay 508CR to the primary winding of a transformer 278, the other side of which is grounded. The secondary winding of this transformer is connected across a potentiometer 279, the slider of which is connected through the normally open contacts of relay 508CR to the line 270. Accordingly, when the relay 508CR is energized, the output from transformer 82 will be connected to the input of the cross slide servo amplifier and thereby control movement of the cross slide 25. With the sleeve 83 locked to the stem 84, this results in 180 depth tracing in the conventional manner and is referred to hereinafter as "manual" depth tracing.

The lead 277 is also connected by the normally closed contacts of relay 508CR with a quadrature gain potentiometer 282, the other side of which is connected by a line 283 to ground. The slider of this potentiometer, which is controlled by the knob 59 (Fig. 4), is connected through the normally open contacts of relays 508CR, 308CRA, 307CR and 507CRA to quadrature attenuation potentiometers 284, 285, and 286. The sliders of the three potentiometers are connected through a second set of contacts of the aforementioned relays which are connected by leads 287 and 288 to rotor windings 289 and 290 of resolvers R–1 and R–2. The other terminal of each rotor winding is connected to ground so that the signal from transformer 82, which is delivered through the quadrature gain potentiometer 282 and the attenuation potentiometers 284, 285 and 286, to the quadrature windings 289 and 290 of the two resolvers.

The two remaining rotor windings of the resolvers 291 and 292 are supplied with a feed rate voltage from a transformer 293 whose primary winding is connected to a source of 400 cycle alternating current which may be the same source 256 that provides energizing current for the transformers 81 and 82. The secondary winding of transformer 293 has a center tap which is connected to ground while the ends of the winding are connected through the normally open contacts of relays 201CRB and 202CRB to one end of a potentiometer winding 295. This potentiometer controls the feed rate during tracing, the slider thereof being controlled by the knob 58 shown in Fig. 4. The feed rate voltage obtained from the slider of the potentiometer is applied through the normally closed contacts of a relay 207CR and a lead 296 to one end of rotor winding 291 on resolver R–1. This voltage is also applied to one end of rotor winding 292 on resolver R–2 through a lead 297 connected to lead 296. The other ends of rotor windings 291 and 292 are connected to ground so as to complete the circuit and cause the windings to be energized with the feed rate voltage. The rotor shafts of the resolvers are coupled together so as to rotate in unison, this coupling being indicated in Fig. 12 by the dotted line 298. Also connected to rotate with the resolvers R–1 and R–2 is the rotor of a synchro transmitter TX–7 which is energized from a suitable source of alternating current 299. The stator leads of the synchro transmitter are connected with the stator leads of a synchro receiver TR–7, the rotor of which is energized from the source 299. The receiver shaft may, for example, be connected to a dial type indicator having a pointer 300 for indicating the orientation of the resolvers.

The resolvers are provided with stator windings 304 and 305 which are situated at right angles to one another and which provide output voltages for controlling the two slides which are selected for 360 depth or profile tracing.

The inner end of winding 304 is connected by a lead 306 and the normally closed contacts of a relay 308CRC with ground lead 266 while the outer terminal of winding 304 is connected by a lead 307 and the normally closed contacts of the same relay with a junction 308. This junction may be selectively connected through the normally open contacts of a relay 308CRB with the input conductor 309 for the longitudinal servo amplifier, or through the normally open contacts of a relay 406CR with the input conductor 310 for the vertical servo amplifier. If the relay 308CRC is energized, the connections will be reversed, i.e., the lead 306 will be connected to the junction 308 while the lead 307 will be connected to ground. As shown in Fig. 13, the conductor 309 is connected to the input terminal of a phase detector 311 which rectifies and detects the phase of the input signal and transmits it to a power amplifier 312 which delivers the amplified D.C. signal to the leads 194 of the torque motor TM–1 (see also Fig. 9). The conductor 310 is connected to the input terminal of a phase detector 313 which delivers the rectified D.C. signal to a power amplifier 314 whose output is connected to the leads 175 of the torque motor TM–3.

Since the feed rate voltage derived from the potentiometer 295 is applied to corresponding rotor windings 291 and 292 of the two resolvers, and since the output stator windings 304 and 305 are arranged in quadrature relationship, the feed rate voltage components appearing in the two output windings will always bear a sine-cosine relationship, and the slides to which the output windings are connected will move at speeds proportional thereto. Hence, the resultant motion of the pattern relative to the tracer will correspond to the vector sum of the sine and cosine components and therefore will remain constant for a given feed rate voltage applied to the windings 291 and 292. Hence, the tracer will always move at a constant feed rate along the pattern regardless of the directional heading of the tracer relative to the pattern. Likewise, by rotating the resolvers, the directional heading of the tracer relative to the pattern may be rotated through a full 360 degrees.

Rotation of the resolvers is controlled by the signal from the transformer 82 appearing in the secondary winding of transformer 265. The output from the secondary winding of transformer 265 is applied through the reversing contacts of relays 201CRA and 202CRA to a conductor 317 which is connected to one end of a rotation gain potentiometer 318. Hence, when the relay 201CRA is energized, the voltage from the transformer 265 will be applied to the potentiometer 318 in one phase, and when the relay 202CRA is energized, the voltage from the transformer will be applied to the potentiometer 318 in the opposite phase. The slider of potentiometer 318, which is controlled by knob 54 (Fig. 4), is connected to a conductor 319 which is connected through normally open relay contacts 211CR (Fig. 13) to the input terminal of a phase detector 320. The output of the phase detector is amplified by a power amplifier 321 and delivered to the coils of torque motor TM–4 through the leads 223. The resolvers will thereby be rotated by the hydraulic servomotor M–4 (Fig. 9) in such a direction as to reduce the error voltage appearing in the output of transformer pickup 82.

As will hereinafter be more fully explained in connection with the wiring diagram, when the relays 201CRA and 201CRB are energized, the phase of the error voltage applied to the rotation servo amplifier and the phase of the voltage applied to the feed rate potentiometer 295 will be such as to provide clockwise tracing of the pattern in a profiling operation. Likewise, when relays 202CRA and 202CRB are energized, the phase of the error voltage applied to the rotation servo amplifier and also the phase of the feed rate voltage applied to the potentiometer 295 will be reversed so as to permit counterclockwise tracing of a pattern.

As hereinbefore noted, the output from stator winding 304 of the resolver R–1 may be applied to the longitudinal servo amplifier by energizing relay 308CRB or to the vertical servo amplifier by energizing relay 406CR. In a similar manner, the output from stator winding 305 of resolver R–2 may be applied either to the longitudinal servo amplifier by energizing a relay 311CR or to the cross slide amplifier by energizing a relay 507CRB.

It will also be observed that the error voltage is applied to rotor windings 289 and 290 which are disposed in quadrature relationship to the feed rate rotor windings 291 and 292. Hence, the error voltage will produce movement of the slides at right angles to the direction of tracing. This voltage, which is derived from potentiometer 282, may be selectively attenuated in accordance with the slide selected for operation. Thus, the attenuation potentiometer 284, which is associated with the vertical slide, may be connected to the winding 289 by energization of relay 408CR. Alternatively, the potentiometer 285, associated with the longitudinal slide, may be connected with winding 289 by energizing relay 308CRA, or this potentiometer may be connected with the winding 290 by energizing relay 307CR. Also, the potentiometer 286 associated with the cross slide may be connected with the winding 290 by energizing relay 507CR. It is thereby possible to suitably attenuate the error signal for each slide selected for operation and cause the compensation afforded by the potentiometers 284, 285, and 286 to be related to the servo amplifiers for the vertical, longitudinal and cross slides, respectively.

The system is also provided with a transformer 325 whose primary winding is connected to the 400 cycle A.C. source 256. The secondary winding of this transformer has a center tap which is connected to ground and which has its end terminals connected to conductors 326 and 327. Either one of these conductors may be connected by relay contacts 302CR or 303CR with a conductor 328 which is connected to one end of a potentiometer 329, the other end of which is connected to ground. The slider of the potentiometer may be selectively connected to a conductor 330 through a second set of relay contacts 302CR or 303CR. The conductor 330 is connected to the input lead 309 for the longitudinal servo amplifier and serves to provide a power feed voltage of one phase or the opposite phase as derived from the secondary winding of transformer 325 when either relay 303CR or 303CR is energized. The potentiometer 329 is controlled by the knob 51 (Fig. 4) and sets the power feed rate for the longitudinal slide. In a like manner the vertical slide may be moved up or down in power feed by energizing a relay 402CR or 403CR to connect a voltage of one phase or the other to the input lead 310 for the vertical servo amplifier. A potentiometer 332 whose slider may be adjusted by the knob 51 (Fig. 4) for the vertical slide, controls the power feed rate in both directions. Relays 502CR and 503CR control the application of the feed rate voltage to the input lead 272 for the cross slide servo amplifier so as to enable the cross slide to be power fed in or out at a rate determined by the setting of a potentiometer 333 which is controlled by the knob 51 for the cross slide.

In the bottom portion of Fig. 12 are shown the three sets of five synchros, each of which provide for hand servo control of the longitudinal, vertical, and cross slides. The hand servo control systems for the three slides are identical so that only one of these need be described. Furthermore, this system will be described only briefly herein inasmuch as this system forms the subject matter of copending patent application, Serial No. 728,819, filed April 16, 1958, by J. M. Morgan, Jr., H. K. Brown and J. A. Rave, Jr., in which application there will be found a complete disclosure of this feature of the machine.

The hand servo control system for the longitudinal slide includes a synchro differential transmitter TDX–1, the rotor of which is connected for rotation by the hand wheel 47 (Fig. 4). The stator windings of the synchro differential transmitter are connected to the stator windings of a "dummy" synchro receiver TR–1, the rotor winding of which is energized from a suitable source of alternating current which may be the same as the source 299 mentioned earlier. This source is connected by a conductor 335 with one side of the rotor winding, the other side of which is connected to a ground conductor 336 which is connected by a conductor 337 with the ground conductor 257. The rotor windings of the synchro differential transmitter TDX–1 are connected through the normally closed contacts of a relay 301CR with the stator windings of a control transformer CT–1. The output signal from the rotor winding of the control transformer is applied across a potentiometer 338, the slider of which is connected by the normally closed contacts of a relay 301CR with a conductor 339 which is connected to the input lead 309 for the longitudinal servo amplifier. Hence, as the hand wheel 47 is rotated, a signal will be produced in the rotor winding of the control transformer which will cause the longitudinal slide to move in one direction or the other, depending upon the direction of the rotation of the hand wheel. As previously explained, in connection with the hydraulic diagram shown in Fig. 9, the rotor of the control transformer CT–1 is driven by the hydraulic motor M–1 through the gears 207 and 209 so as to follow the movement of the longitudinal slide. As the slide moves, it will turn the rotor of the control transformer in a direction tending to reduce the output thereof to zero.

In order to disconnect the hand wheel from the slide, the relay 301CR is energized, thereby disconnecting the lead 339 from the potentiometer 338, the slide then being controlled either by the tracer control apparatus previously described or by the power feed control circuits also previously described. To prevent jump of the longitudinal slide when the hand wheel is reengaged at the conclusion of a tracing or power feeding operation, the dummy synchro TR–1, together with the synchro differential transmitter TDX–1, and a synchro transmitter TX–1 are provided in the arrangement shown herein. The rotor of the dummy synchro has no mechanical connection to any other part of the apparatus and rotates in a purely idle fashion, while the rotor of the transmitter synchro TX–1, as shown in Fig. 9, driven by the hydraulic motor M–1 so as to rotate in synchronism with the longitudinal slide. Accordingly when the relay 301CR is energized, the normally open contacts of this relay shown in Fig. 12 are closed, thereby connecting the stator windings of the synchro transmitter with the rotor windings of the synchro differential transmitter and, at the same time, the normally closed contacts of the relay will be opened to disconnect the control transformer from the system. As the slide now moves under tracer or power feed control, the transmitter synchro TX–1 will drive the rotor of the dummy synchro TR–1 through the synchro differential transmitter and cause the rotor of the dummy synchro to follow the movements of the slide and of the control transformer. Hence, when relay 301CR is again deenergized to reconnect the handwheel to the slide, the rotor of the dummy synchro will be in synchronism with the rotor of the control transformer and will cause a null voltage to be present in the rotor winding of the control transformer so that no jump of the slide will occur.

This system also includes a synchro receiver TR–2, the stator windings of which are connected to the stator windings of the synchro transmitter TX–1 so that as the transmitter follows the movement of the slides the dial 48 (see Fig. 4) connected to the rotor of the synchro receiver TR–2 will at all times indicate the position of the longitudinal slide.

*Electrical control circuits*

In Figs. 14*a* to 14*e*, inclusive, is shown the wiring diagram for the electrical control circuits of the machine. As indicated in this diagram, a source of energizing current is provided by a pair of parallel conductors 345 and 346 disposed vertically on the sheet and extending from one sheet to the next. Disposed along the left hand margin of the wiring diagram is a series of index numbers marking the horizontal lines of the diagram. These lines are numbered from 75 (Fig. 14*a*) to 195 (Fig. 14*e*) and provide a convenient reference or guide for locating the various components in the circuit. The control relays and solenoids are all disposed along the right hand side of the wiring diagram and to the right of each relay or solenoid is a legend indicating its function in the circuit. The numerals and figures beneath the legends indicate the location of the relay contacts, the underscored numerals indicating normally closed contacts. The numbers within the brackets following a figure number indicate the number of relay contacts to be found in that figure.

In the wiring diagram, the spaced vertical conductors 345 and 346 are connected to terminals 347 (Fig. 14*a*) which are connected to a suitable source of energizing current for the relays and solenoids. The circuit includes a four-position selector switch 348 which may be manually set to any one of four positions by the knob 55 shown in Fig. 4. This switch controls the energization of relays 101CR, 102CR, 103CR, and 104CR, and thereby selects the type of tracing to be performed by the machine. The manner in which the control relays determine the mode of operation of the machine tool can best be understood by considering the operation of the relays for each setting of the switch 348 and, accordingly, the following description will be divided into separate sections corresponding to the different types of tracing which may be selected by means of this switch.

*Manual*

When it is desired to operate the machine by hand, the selector switch 348 is set in the "manual" position thereby energizing relay 101CR (75). Power feeding of the slides under the control of pushbuttons 49, 50, 52 and 350–355 (Fig. 4) is thereby enabled in the following manner:

The contacts 101CR in line (131) will be closed so that when push button 50 (131) is depressed, relay 302CR (131) will be energized and its contacts 302CR in Fig. 12 will be closed. Thereby, a voltage of proper phase is delivered from the power feed transformer 325 to the longitudinal feed potentiometer 329 and thence to the input lead 309 for the longitudinal servo amplifier to cause the hydraulic motor M–1 (Fig. 9) to move the column to the left. When the push button 49 (135) is depressed, relay 303CR is energized, and its contacts 303CR in Fig. 12 are closed. A voltage of opposite phase is now delivered to the potentiometer 329 and thence to the input lead 309 of the longitudinal servo amplifier to cause the hydraulic motor M–1 to move the column to the right. When the stop push button 52 (131) is depressed, the relays will be deenergized, and power feeding movement of the slide will be terminated.

Figure 14A:
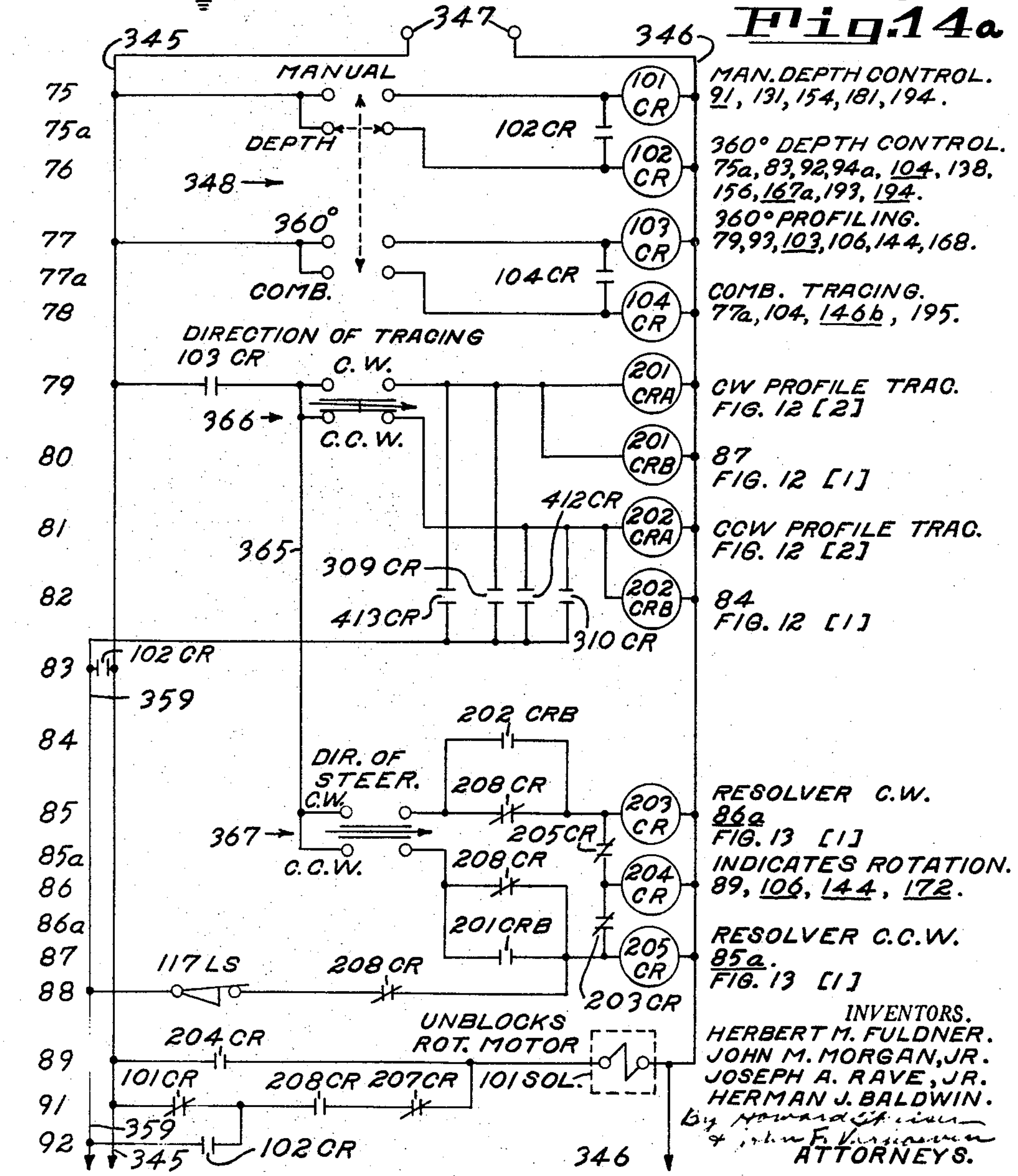
Figure 14B:
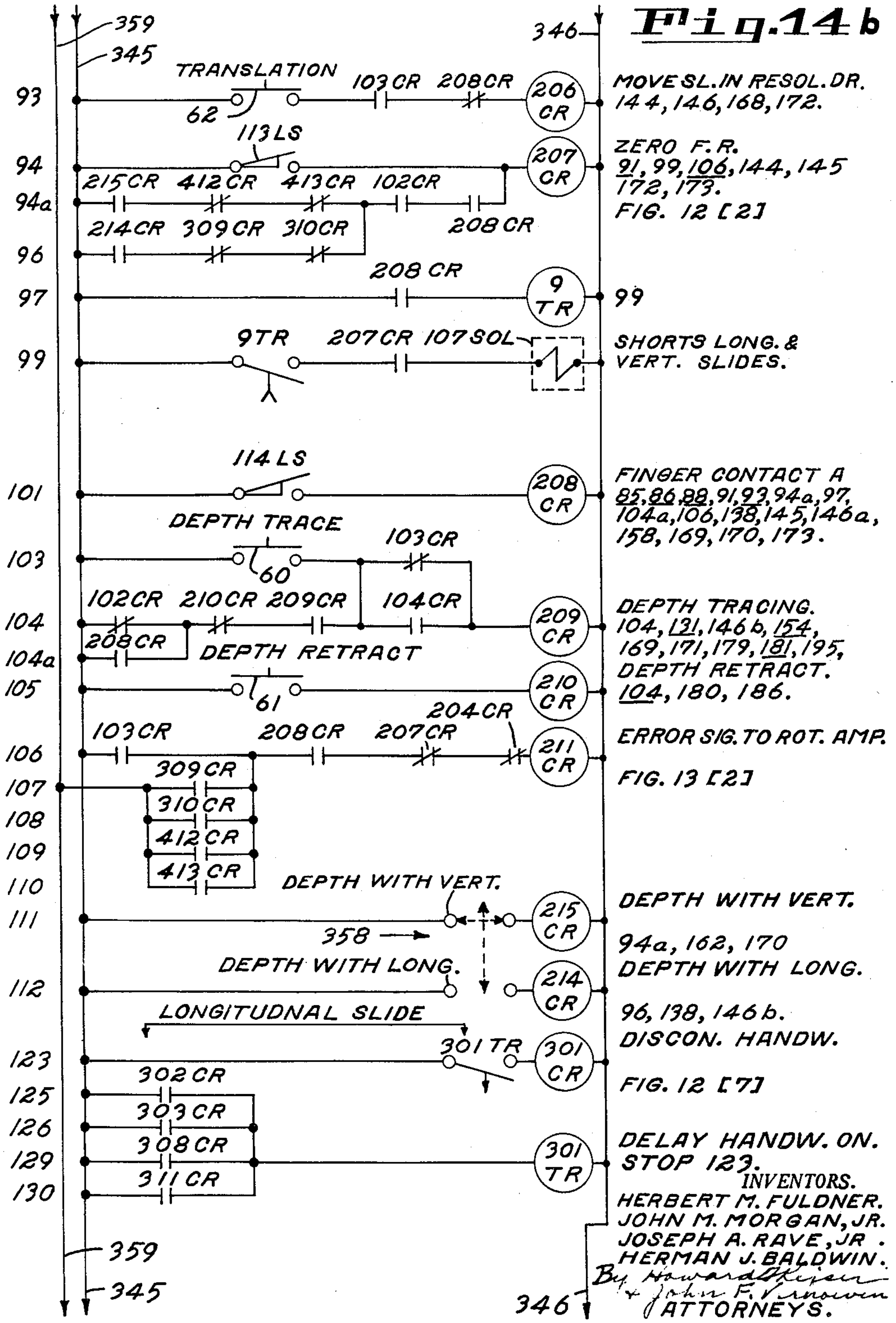
Figure 14C:
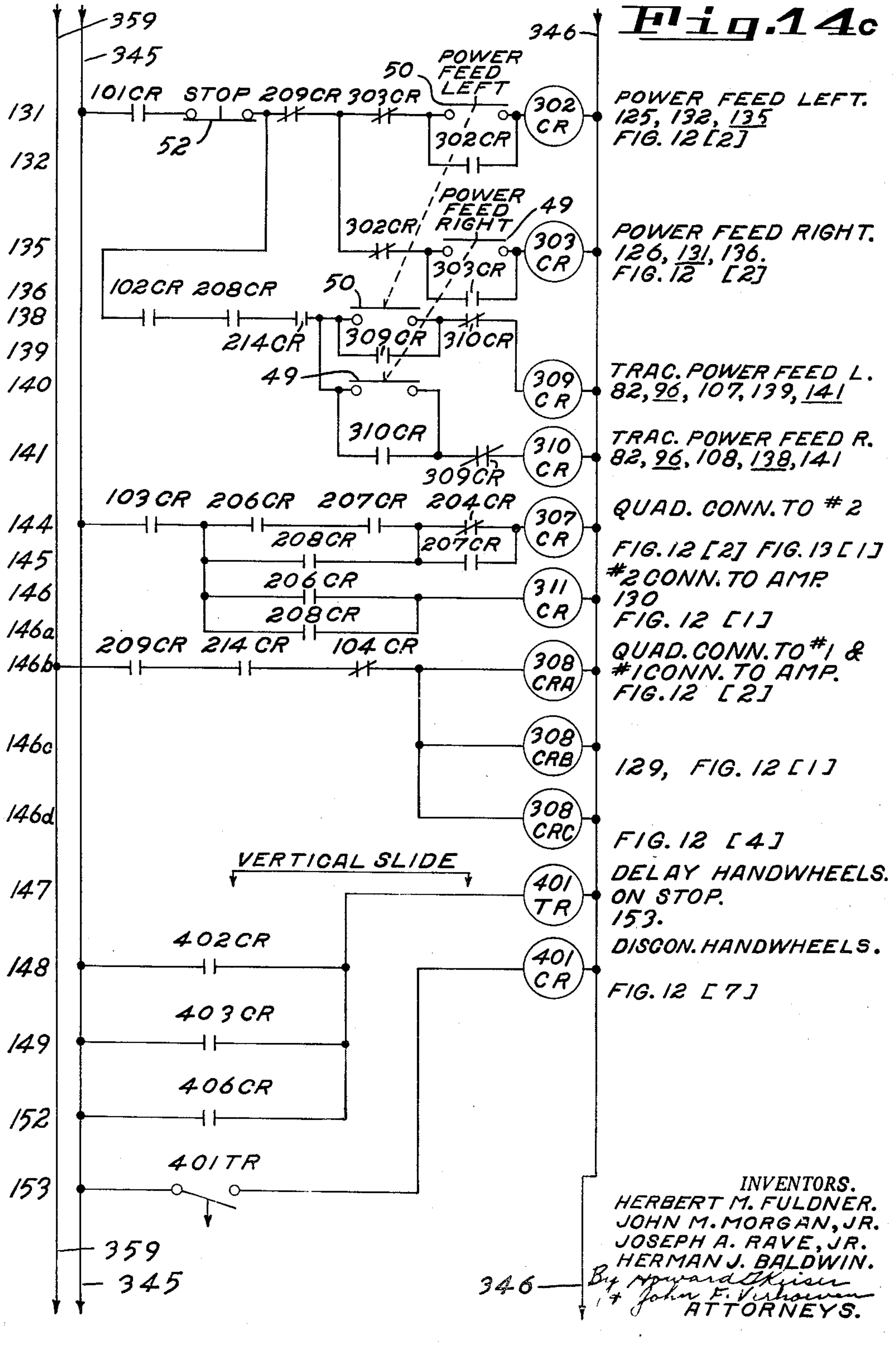
Figure 14D:
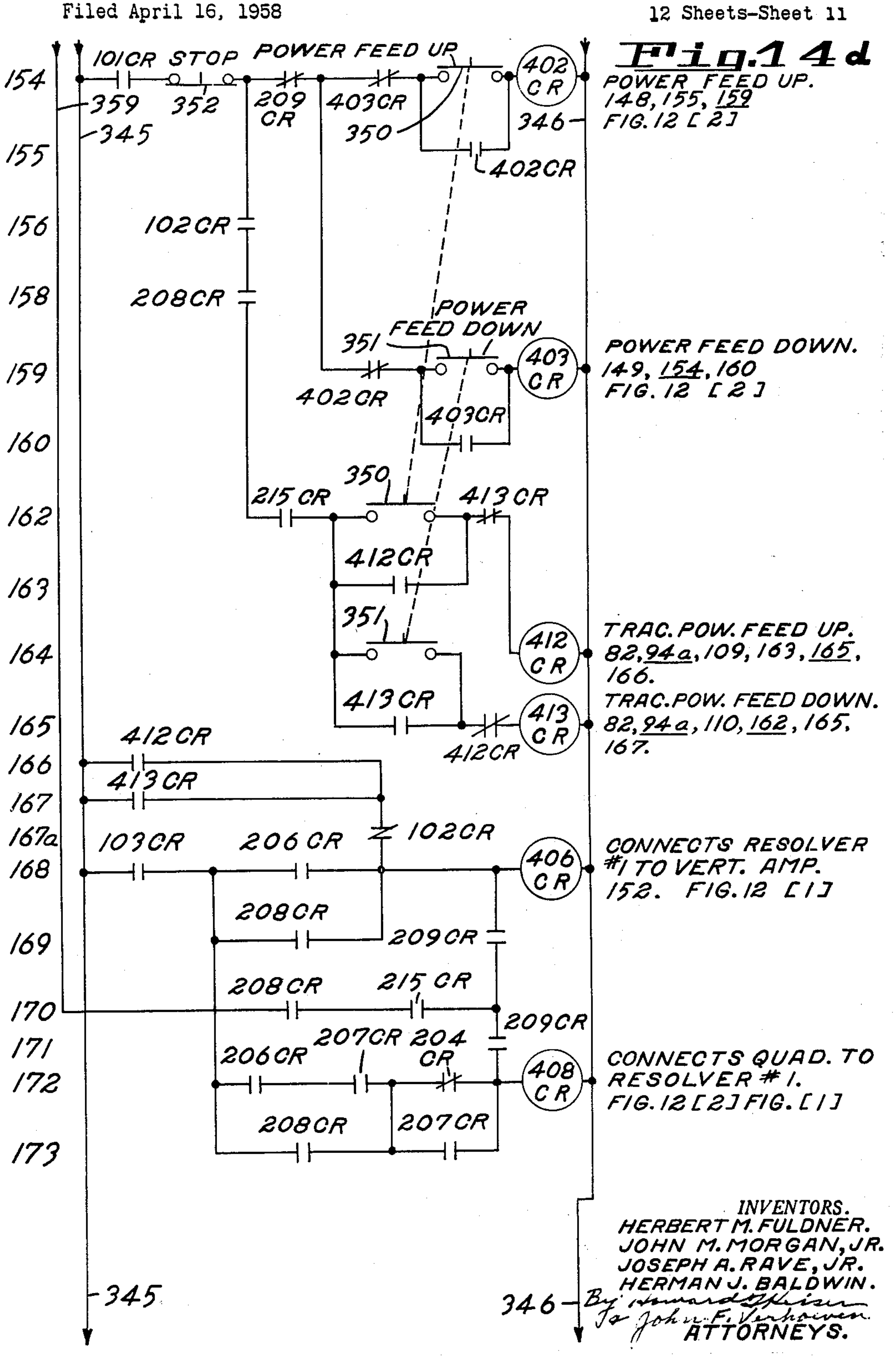
Figure 14E:
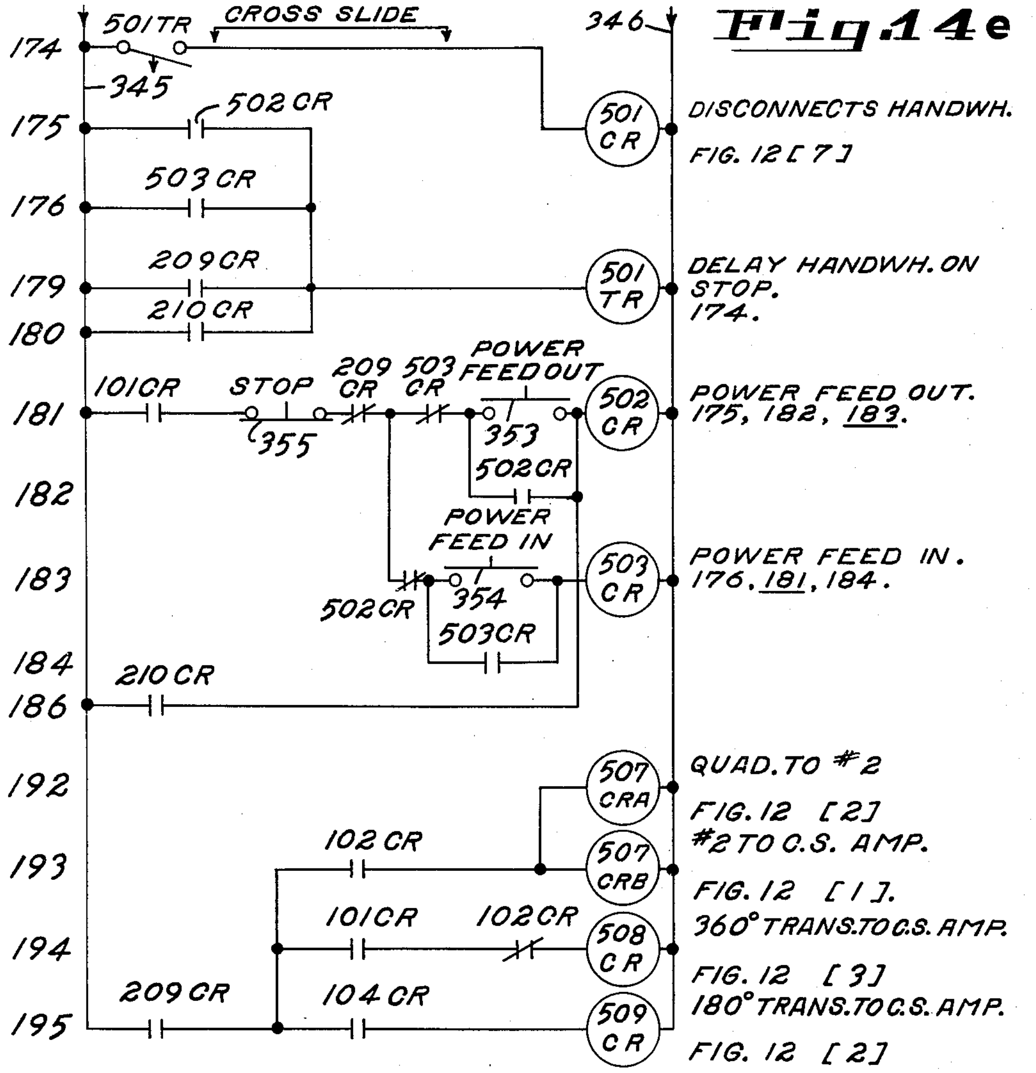

The contacts of relay 101CR in line 154 will also be closed, thereby enabling power feed of the vertical slide under the control of push buttons 350 and 351 shown in Figs. 4 and 14*d*. When push button 350 is depressed, relay 402CR is energized and its contacts 402CR in Fig. 12 are closed, thereby supplying a voltage of proper phase to the vertical power feed potentiometer 332 and input lead 319 for the vertical servo amplifier to cause the hydraulic motor M–3 to move the saddle up. When the push button 351 is depressed, the relay 403CR (159)

is energized, and its contacts 403CR in Fig. 12 are closed. A voltage of opposite phase will now be delivered to the potentiometer 332 and input lead 310 to the vertical servo amplifier to cause the motor M–3 to move the saddle down. Depression of the "Stop" push button 352 (154) will deenergize the relays and stop power feeding movement of the vertical slide or saddle.

The contacts 101CR in line (181) will also be closed, thereby enabling power feed of the cross slide under control of push buttons 353 (181) and 354 (183). When pushbutton 353 is depressed, relay 502CR is energized and its contacts 502CR in Fig. 12 are closed. A voltage of the proper phase is thereby delivered to the cross slide power feed potentiometer 333 to cause the hydraulic motor M–2 to move the spindle carrier 25 out or away from the work. When the push button 354 is depressed, the relay 503CR is energized, and its contacts 503CR in Fig. 12 are closed. A voltage of opposite phase is now delivered to the potentiometer 333 and to the servo amplifier for the cross slide, thereby causing rotation of the motor M–2 in the opposite direction to move the spindle carrier or cross slide in toward the work. Depression of the "Stop" push button 355 will deenergize the relays and stop further feeding movement of the cross slide in either direction.

To effect manual depth tracing, the "Depth Trace" push button 60 (103) is depressed thereby energizing relay 209CR and closing the contacts of this relay in line 195. Since the contacts 101CR in line 194 are now closed, relay 508CR will be energized and the two sets of normally open contacts of this relay in Fig. 12 will be closed to connect the 360 transformer 82 to the cross slide servo amplifier. For manual depth tracing the sleeve 83 (Fig. 6) and stem 84 of the tracer are locked together by collar 122 in the manner previously described. Since the tracing finger is now in an underdeflected position, the transformer 82 will provide an "in" signal to the cross slide servo amplifier and move the finger into contact with the pattern. The finger will thereby be displaced axially to a position of normal deflection whereupon "in" feeding movement of the cross slide will stop. When the pushbutton 60 (103) was depressed and relay 209CR energized, the normally closed contacts of this relay in lines 131, 154, and 181 were thereby opened so as to disable power feeding movement of the slides by the power feed pushbuttons. Also, the contacts 209CR in line 179 were closed thereby energizing timing relay 501TR and closing the contacts of this relay in line 174. Hence, relay 501CR was energized to disconnect the handwheel 47 for the cross slide. Depth tracing may now be effected by manipulation of the handwheels 47 for the longitudinal and vertical slides to traverse the slides back and forth while the cross slide follows the contour of the pattern under the control of the tracing finger.

Since the depth tracing control relay 209CR (104) will be held energized by the contacts 209CR in line 104 after the push button 60 is released, depth tracing will continue until the "Depth Retract" push button 61 (105) and Fig. 4 is depressed to energize relay 210CR and open the normally closed contacts of this relay in line 104 to deenergize relay 209CR. Thereupon, relay 508CR (194) will be deenergized and disconnect transformer 82 from the cross slide servo amplifier. The contacts 209CR in line 179 will be opened and relay 501TR will be deenergized thereby deenergizing relay 501CR to return the cross slide to hand servo control as previously described in connection with Fig. 12.

Contact of the tracing finger with the pattern is sensed by a limit switch 114LS (101) which, as shown in Fig. 6, is normally held open by the block 111 when the finger is in an underdeflected position. When the tracing finger contacts the pattern, the block 111 is moved to the right, as viewed in Fig. 6, thereby releasing the plunger of limit switch 114LS and permitting it to close and energize relay 208CR. The contacts of relay 208CR in line 91 are thereby closed and would normally function to cause solenoid 101SOL to become energized and unblock the rotation motor M–4. However, in manual tracing operation, the contacts 101CR in line 91 are open so that energizing of solenoid 101SOL is prevented. Since the blocking valve 226 (Fig. 9) operated by solenoid 101SOL is normally in blocking position, no rotation of the resolvers R–1 and R–2 can take place in manual tracing operations.

*Depth with vertical*

When 360 depth tracing is selected by moving the tracing selector switch 348 to the "Depth" position as shown in line 75*a*, the switch 358 (line 111) must also be set to select the proper plane of 360 depth tracing. In the wiring diagram, the switch is shown in its "Depth with Vertical" position which energizes relay 215CR and selects the vertical slide for combined movement with the cross slide so that tracing of a pattern like the pattern 68 shown in Fig. 5 may be effected. The tracer and cutter will progress at a constant feed rate corresponding to the value selected by the tracing feed rate knob 58 (Fig. 4) during each pass across the workpiece and pattern. This is brought about by properly connecting the resolvers R–1 and R–2 to supply sine and cosine components of the feed rate voltage to the two slides involved so that the rate of the resultant motion produced by the conjoint operation of the two slides remains constant in all directions.

In the embodiment of the invention disclosed in this application, two resolvers have been utilized in order to permit additional flexibility in circuit design. It will be obvious to those skilled in the art that one resolver could be used in place of the two herein shown if there is no need for individual control of the quadrature and/or feed rate input so as to provide differently modified output voltages for the servo amplifiers.

With the tracing selector switch 348 set in the "Depth" position, relay 102CR is energized, thereby closing the contacts 102CR in line 75*a* so as to energize relay 101CR. The contacts of 101CR in lines 91, 131, 154, 181, and 194 are thereby operated with the results heretofore described in the preceding section.

When relay 102CR is energized, its contacts in line 83 are closed, thereby energizing the line 359. As a result, relays 204CR and 205CR (86 and 87) will be energized through the normally closed contacts of limit switch 117LS (88), relay 208CR (88), and relay 203CR (86*a*). Energization of relay 204CR unblocks the rotation motor M–4 (Fig. 9) by closure of contacts 204CR in line 89 to energize solenoid 101SOL. Energization of relay 205CR unbalances the rotation amplifier by the closure of the contacts of this relay in Fig. 13. When the contacts 205CR in Fig. 13 are closed, a resistor 360 is connected in shunt across the center lead 223 of the torque motor coils and the bottom lead thereof. The center lead is connected with a source of positive D.C. potential 361 which normally flows through the center lead 223, thence through the torque motor coils and thence through the top and bottom leads 223 to the plates of the power tubes in the power amplifier 321. When the contacts 205CR are closed, the resistor 360 shunts a considerable portion of the current around the coil connected to the center and bottom leads, thereby unbalancing the torque motor in a direction to cause counterclockwise rotation of the resolvers. When the quadrature winding 290 (Fig. 12) on resolver R–2 is brought into alignment with the output winding 305 of the resolver, the lobe 236 on cam 235 (Fig. 9) opens the contacts of limit switch 117LS and deenergizes relays 204CR and 205CR. When relay 204CR is deenergized, its contacts in line 89 open and deenergize solenoid 101SOL which stops rotation of the resolvers.

With the machine thus conditioned for 360 depth tracing in the depth with vertical plane, the depth tracing operation may be initiated by depression of the push button 60 (103) so as to energize relay 209CR and close the contacts of this relay in line 195. Since the contacts 102CR in line 193 are now closed, relays 507CRA and 507CRB will be energized and cause the two pairs of contacts 507CRA and the single pair of contacts 507CRB shown in Fig. 12 to close. The output of transformer 82 will thereby be connected to the quadrature winding 290 on the rotor of resolver R–2 and the output winding 305 on the stator of this resolver will be connected to the input of the cross slide servo amplifier through conductors 271 and 272. At this time, relays 201CRB and 202CRB are deenergized so that their contacts in Fig. 12 will remain open and no feed rate voltage will be applied to the feed rate windings 291 and 292 on the resolvers. Relays 406CR and 408CR (168 and 172) being deenergized, their contacts in Fig. 12 will remain open so that the resolver R–1 will be disconnected from the circuit and the vertical slide will remain at rest. However, so long as the tracing finger is out of contact with the pattern, it is underdeflected and an error signal will be produced by the 360 transformer 82 and applied to the quadrature winding 290 of the resolver R–2. Thereupon, the cross slide servo amplifier will be biased in an "In" direction to move the tracing finger into the pattern.

When the tracing finger contacts the pattern, the limit switch 114LS (Fig. 6 and line 101) will be released and cause relay 208CR to become energized. The contacts 208CR in line 104*a* will thereupon be closed to provide a holding circuit for the relay 209CR around the push button 60 (103). Closure of the contacts 208CR in lines 94*a* and 97 will energize the zero feed rate relay 207CR and the timer relay 9TR and close the contacts of these relays in line 99. Solenoid 107SOL will thus be energized and operate the valve 240 (Fig. 9) to short the motor lines for the longitudinal and vertical slides and so prevent movement thereof. Closure of the contacts 208CR in line 170 will energize relays 406CR and 408CR through the contacts of relay 209CR in lines 169 and 171 which are now closed. Closure of the two pairs of contacts 408CR in Fig. 12 will connect the signal from the transformer 82 to the quadrature winding 289 on the rotor of resolver R–1. Closure of the single pair of contacts 406CR shown in Fig. 12 will connect the output winding 304 on the stator of the resolver R–1 with the input line 310 of the vertical servo amplifier.

Vertical depth tracing of the pattern 68 (Fig. 5) may now be performed by depressing either the "Power Feed Up" push button 350 (162) or the "Power Feed Down" push button 351 (164), as may be appropriate under the circumstances. When the push button 350 is depressed the relay 412CR will be energized, while depression of the push button 351 will cause relay 413CR to be energized. Relays 402CR and 403CR will not be energized at this time since the normally closed contacts 209CR in line 154 are now open. Relay 412CR controls the energization of relays 202CRA and 202CRB (81 and 82) through its contacts 412CR in line 82, while relay 413CR controls the energization of relays 201CRA and 201CRB through its contacts 413CR in line 82. As shown in Fig. 12, the relays 201CRA and 202CRA have contacts which control the sense of the signal delivered by the 360 transformer 82 to the rotation servo amplifier, while the contacts of relays 201CRB and 202CRB control the sense of the feed rate signal delivered to the feed rate windings 291 and 292.

Relays 412CR and 413CR also have normally closed contacts in line 94*a* which will open and deenergize relay 207CR when the power feed push buttons are depressed. This will deenergize the solenoid 107SOL and restore the shorting valve 240 to its normal position and reestablish the operation of the longitudinal and vertical slides. Deenergization of relay 207CR will also close contacts 207CR in line 91 and cause solenoid 101SOL to be energized, thereby unblocking the rotation motor M–4. Relays 412CR and 413CR also have contacts in lines 109 and 110 which cause relay 211CR (106) to be energized, thereby connecting the rotation servo amplifier to the conductor 319 as shown in Fig. 13.

Since a feed rate voltage will now be applied to the feed rate windings of the resolvers R–1 and R–2, and since the output windings of the resolvers are displaced 90 degrees with respect to one another, the feed rate voltage components appearing in the two output windings 304 and 305 will, as previously mentioned, always bear a sine cosine relationship to one another, and the slides will move at speeds proportional thereto. Thereby, the resultant motion of the two slides will correspond to the vector sum of the sine and cosine components which will remain constant and cause the cutter and tracer to always move at a constant feed rate regardless of changes in direction in the pattern contour.

Error signals sensed by the 360 transformer due to overdeflections or underdeflections of the tracing finger are applied to the rotation servo amplifier to rotate the resolvers and change the direction of travel of the tracing finger so as to cause it to follow the contour of the pattern.

The changes in the directional heading of the tracing finger (and of the resolvers) as it moves along the pattern are indicated in Fig. 8 by the series of arrows 363. The error signals from the transfomer 82 are also fed to the quadrature windings 289 and 290 of the resolvers and thereby applied to the vertical slide and cross slide at right angles to the direction of travel effected by the feed rate voltage. Hence, the error signal will have the effect of moving the tracing finger directly toward or away from the pattern, i.e., at right angles to the small arrows shown in Fig. 8, so that any deviation of the tracer from the outline of the pattern will be corrected independently of the change in directional heading produced by the rotation of the resolvers in response to the error signal.

Depth with vertical tracing of the pattern may be continued under the control of the "Up" and "Down" push buttons 350 and 351 and the "Stop" push button 352 which may be operated in the proper sequence to move the tracing finger up and down across the pattern. Pick feeding movement of the longitudinal slide between vertical passes of the tracer over the pattern may be effected by the hand wheel 47 for the longitudinal slide.

*Depth with longitudinal*

If it is desired to effect 360 depth tracing in a horizontal plane in order to trace a pattern such as the pattern 65 shown in Fig. 5, the selector switch 358 (111) is moved to the "Depth with Longitudinal" position, thereby energizing relay 214CR and deenergizing relay 215CR. This will cause the longitudinal slide to be selected for combined movement with the cross slide so that horizontal tracing of the pattern may be accomplished.

When relay 214CR is energized, its contacts in line 146*b* are closed, thereby energizing relays 308CRA, 308CRB and 308CRC. When the relay 308CRA is energized, its two sets of contacts shown in Fig. 12 are closed, thereby connecting the error signal from the transformer 82 to the quadrature winding 289 on the rotor of resolver R–1. The relay 308CRC has two sets of normally open contacts and two sets of normally closed contacts shown in Fig. 12. When the relay is energized, these contacts are operated to connect the outer end of the output winding 304 on the stator of resolver R–1 to ground while the inner end thereof is connected to the junction 308. When the relay 308CRB is energized, its single pair of normally open contacts shown in Fig. 12 are closed to connect the junction 308 to the input lead 309 of the longitudinal servo amplifier. The error signal from the 360 transformer is also connected, as before, to the quadrature winding 290 of resolver R–2 through the contacts of relay 507CRA (Fig. 12) while the output winding of resolver R–2 is connected to the cross slide servo amplifier through the contacts of relay 507CRB. Left hand or right hand tracing is effected by push button 50 or push button 49 (138, 140) to energize either relay 309CR which effects tracing power feed to the left, or relay 310CR which effects tracing power feed to the right. Closure of contacts 309CR or 310CR in line 82 energizes either relays 201CRA and 201CRB or relays 202CRA and 202CRB. These relays by their contacts shown in Fig. 12 cause either left hand feeding movement of the tracer across the pattern 65 with rotation of the resolvers in the appropriate direction to follow the outline of the pattern, or right hand feeding movement across the pattern with reverse rotation of the resolvers. Energization of relays 309CR or 310CR also causes the contacts of these relays in line 107 or 108 to be closed. thereby energizing relay 211CR so as to cause the error signal to be fed to the rotation servo amplifier through the lead 319 as shown in Fig. 13.

Pick feeding movement of the third slide (vertical) may be accomplished at the end of each pass by manipulation of the hand wheel 47 for that slide. The cutter and tracing finger may thereby be adjusted vertically for the next pass, after which the appropriate push button 49 or 50 may be depressed to traverse the cutter back across the workpiece. After each pass, the "Stop" push button 52 must be depressed to stop the tracing feed. The hand wheel 47 may then again be manipulated to reposition the cutter for the next pass.

*Hand wheels*

The control of the slides by the hand wheels 47 has been generally described in an earlier portion of this description. The hand wheels are normally engaged but are disengaged during power feeding or tracing operations. This is effected by the time delay relays 301TR (129), 401TR (147), and 501TR (179) which are energized during power feeding and tracing operations by closing of the appropriate contacts 302CR, 303CR, 402CR, 403CR, 502CR, and 503CR found in lines 125, 126, 148, 149, 175 and 175, respectively. The time delay relays, in turn, energize relays 301CR, 401CR, and 501CR which, when energized, disconnect the hand wheels as earlier explained. When the power feeding or tracing operation is concluded, the relays 301TR, 401TR, and/or 501TR are deenergized and, after a suitable time delay, the contacts 301TR (123), 401TR (153), and 501TR (174) are opened to deenergize the relays 301CR, 401CR, and/or 501CR, and reestablish hand wheel control.

The purpose of the time delay introduced by the timer relays is to permit the slides to be brought to a complete halt before the hand wheels are reengaged. By so doing, the dummy synchros TR–1, TR–3, and TR–5 (Fig. 12) will be brought to a complete stop before they are disconnected from the transmitter synchros TX–1, TX–3, and TX–5. This precaution is necessary to prevent the dummies from coasting after being disconnected which would cause the slides to also coast until the dummies stopped rotating.

Provision is made for bringing the slides to a rapid but smooth stop by means of the integration circuits shown in Fig. 13. These circuits are each comprised of a resistor 370 and a capacitor 371 connected in series across the output leads of the phase sensitive detectors 313 and 311. In tracing operations, these circuits are not required and may, in fact, be undesirable in 360 profiling operations. Hence, when relays 408CR and 307CR are energized to connect the error signal from transformer 82 to the quadrature windings as resolvers R–1 and R–2, the contacts of these relays shown in Fig. 13 will open and disconnect the integration circuits from the servo amplifier leads.

*360 profiling*

When 360 degree profiling is desired in a vertical and longitudinal plane as, for instance, when it is desired to machine the edge of a workpiece such as the workpiece 73, shown in Fig. 5, in accordance with the profile 72 of a pattern 71, the tracing selector switch 348 is turned to the position marked "360." Thereupon, relays 101CR and 102CR are deenergized so as to open contacts 102CR (83) and deenergize line 359 while relay 103CR is energized. The normally open contacts of this relay in line 79 will be closed, thereby energizing a line 365. Clockwise or counterclockwise movement of the tracer around the pattern may be selected by a two-position switch 366 (79) which is controlled by the knob 56 shown in Fig. 4. The setting of this switch determines whether relays 201CR or relays 202CR shall be energized, the former being effective by means of contacts shown in Fig. 12 to produce clockwise tracing and the latter being effective to produce counterclockwise tracing.

To steer the tracing finger into contact with the pattern, the resolvers are first rotated by means of a switch 367 (85) which is controlled by the knob 57 shown in Fig. 4 and which is normally spring urged to the center position, as shown in the wiring diagram, when the knob 57 is released. The resolvers are thus rotated until the direction of tracing indicated by the dial indicator 300 (Fig. 12) is tangential to the edge of the pattern. The switch 367, when turned to the clockwise position, causes relays 203CR and 204CR to be energized to energize solenoid 101SOL and unblock the rotation motor M–4, and also to unbalance the rotation servo amplifier by closing the contacts 203CR in Fig. 13 whereupon the torque motor will be biased to cause clockwise rotation of the resolvers. When turned to the counterclockwise position, the relays 204CR and 205CR will be energized to again unblock the rotation motor and cause the contacts 205CR in Fig. 13 to be closed, thereby unbalancing the servo amplifier in the opposite sense so as to cause counterclockwise rotation of the resolvers. The tracing feed rate knob 58 (Fig. 4) is then turned to select zero feed rate in which position of the dial the limit switch 113LS (94) is permitted to close by a suitable cam operated by the knob 58. It is to be noted that the slides are not blocked at this time since the contacts 208CR (97) are open and relay 9TR is deenergized. The "Translation" push button 62 (93) is then depressed to energize relay 206CR. The contacts of this relay in lines 146 and 168 are thus closed thereby energizing relays 311CR and 406CR. Closure of contacts 406CR in Fig. 12 connects the output winding 304 of resolver R–1 to the input of the vertical servo amplifier while the closure of contacts 311CR connects the output winding 305 of resolver R–2 to the longitudinal servo amplifier. The contacts of relay 206CR in lines 172 and 144 are also closed, thereby energizing relays 408CR and 307CR. Each of these relays has two pairs of normally open contacts as shown in Fig. 12, which, when closed, serve to connect the signal from the 360 transformer 82 to the quadrature windings 289 and 290 of the resolvers through the appropriate attenuation potentiometers 284 and 285, respectively. Since the tracing finger is underdeflected, an error signal will be produced and supplied to the quadrature windings, thereby moving the tracer finger in a direction perpendicular to the direction of tracing, or toward the pattern.

When the tracing finger makes contact with the pattern, the limit switch 114LS (101) is released, thereby energizing relay 208CR. The normally closed contacts of this relay in line 93 are thereby opened to deenergize relay 206CR and thus disable further control by the "Translation" push button 62. At the same time, the contacts 208CR in line 91 are closed, thereby conditioning solenoid 101SOL for energization with consequent unblocking of the rotation motor when the tracing feed rate knob 58 is moved away from the zero position.

The contacts 208CR in line 106 are also closed to condition relay 211CR for energization when knob 58 is turned away from zero and thereupon operate the contacts of this relay shown in Fig. 13 to connect the rotation servo amplifier with the error signal from the transformer 82. The contacts of relay 208CR found in line 173 are also closed, thereby energizing relay 408CR and closing its two pairs of normally open contacts in Fig. 12 to connect the error signal from the transformer 82 to the quadrature winding 289 of the resolver R–1 by way of the vertical quadrature attenuation potentiometer 284. A tracing feed rate voltage will be supplied to the feed rate windings 291 and 292 of the resolvers R–1 and R–2 through the normally closed contacts 207CR when the tracing feed rate knob 58 is turned away from the zero position.

The contacts of relay 208CR in line 169 are also closed so as to energize relay 406CR and close its contacts in Fig. 12, thereby connecting the output winding 304 of resolver R–1 to the vertical servo amplifier. The contacts 208CR in line 145 are also closed to energize relay 307CR, thereby closing its two sets of normally open contacts in Fig. 12 to connect the error signal from the 360 transformer 82 to the quadrature winding 290 of the resolver R–2 by way of the longitudinal quadrature attenuation potentiometer 285. The contacts of relay 208CR in line 146*a* are closed to energize relay 311CR and close the contacts of this relay in Fig. 12 to connect the output winding 305 of resolver R–2 to the longitudinal servo amplifier.

If the tracing feed rate knob 58 is now turned away from zero position, the machine will start to trace around the pattern at a uniform feed rate as a result of the resolution of the feed rate voltage into sine and cosine components which are transmitted to the longitudinal and vertical slides to produce a resultant velocity of the slides which is constant in all directions.

To terminate the tracing operation, the steering knob 57 is turned to steer the tracing finger away from the pattern. If the knob is accidentally turned in the wrong direction, nothing will happen since the inappropriate contacts 201CRB (87) or 202CRB (84) will then be open and prevent energization of relay 203CR or 205CR. Assuming that the tracer is moving in a counterclockwise direction around the pattern as indicated by the position of the switch 366 (79), and that the steering knob 57 is turned to steer the finger clockwise, then, since relay 202CRB is energized, its contacts 202CRB (84) will be closed and relays 203CR and 204CR will be energized. Relay 204CR acts to disconnect the quadrature voltage from resolvers R–1 and R–2 (144 and 172) and feed rate voltage to the servo amplifiers is maintained until limit switch 114LS (101) is operated by underdeflection of the finger to deenergize relay 208CR. The feed rate voltage is thereby removed from the servo amplifiers and the tracing finger will stop. To steer away from the pattern, the "Translation" pushbutton 62 (93) is depressed to energize 206CR which again connects the resolvers to the servo amplifiers and permits the tracing finger to be steered away from the pattern under the control of knob 57. Thereafter, the "Depth Retract" pushbutton 61 (105) may be depressed to move the finger out of the plane of the pattern.

*Combined depth and 360*

In the present machine it is also possible to perform 360 degree profiling and depth tracing simultaneously. In the case of the pattern 71 shown in Fig. 5, for example, it is possible to trace both the profile 75 and the face 74 simultaneously. To accomplish this, the stem 84 of the tracer (Fig. 6) is unlocked from the sleeve 83 in the manner previously described whereby axial deflections of the stem 84 are then sensed by the depth transformer 81 while lateral deflections of the sleeve are sensed by the 360 transformer 82. The tracing selector switch 348 is moved to its "Combination" position, thereby causing relays 103CR and 104CR to be energized. Hence, either relays 201CR or 202CR will be energized in accordance with the setting of switch 366 to select either clockwise or counterclockwise tracing around the pattern outline.

To move the end of the tracing finger into contact with the surface 74 of the pattern, the "Depth Trace" push button 60 (103) is depressed, thereby energizing relay 209CR. The contacts 209CR in line 195 are thereby closed and relay 509CR is energized to close its two pairs of normally open contacts in Fig. 12 and thus connect the depth transformer 81 with the cross slide servo amplifier. Since the transformer 81 is unbalanced due to the underdeflected condition of the tracing finger, the cross slide will be moved toward the pattern until the tracing finger has made contact therewith and balanced the transformer 81. Hence, as the tracing finger moves around the pattern, it will also follow the surface 74, the cross slide being moved in and out under the control of the depth transformer in accordance with variations in the depth of the pattern surface.

As in the case of 360 degree profiling, the tracing finger may be moved into contact with the profile 75 of the pattern by first manipulating the "Steering" knob 57 to set the heading of the tracer parallel to the edge of the pattern, then setting the knob 58 for zero feed rate, and then depressing the "Translation" push button 62 (93).

Upon contact being made with the pattern, relay 208CR (101) will be energized and close its contacts in line 91 to condition solenoid 101SOL for energization when the feed rate knob 58 is turned up. The contacts 208CR in line 93 will be opened and cause relay 206CR to be deenergized and stop further movement of the tracing finger under the control of the "Translation" push button. The contacts 208CR in line 106 will close and condition relay 211CR for energization when feed rate knob 58 is turned away from zero to thereby operate contacts 211CR in Fig. 13 and connect the error signal from the transformer 82 to the rotation servo amplifier. The contacts of relay 208CR in lines 169 and 173 will be closed and condition relays 406CR and 408CR for energization. Also, the contacts 208CR in lines 145 and 146*a* will close and condition relays 307CR and 311CR for energization. As shown in Fig. 12, when the contacts of relays 408CR and 307CR are closed, the error signal from the transformer 82 will be connected by attenuation potentiometers 284 and 285 to the quadrature windings 289 and 290 of the resolvers. Also, when the contacts of relays 406CR and 311CR are closed, the output windings 304 and 305 of the resolvers will be connected to the vertical and longitudinal servo amplifiers. If the feed rate knob 58 is now turned up, a feed rate voltage will be supplied to the resolvers from the feed rate potentiometer 295 and the tracing finger will move along the edge of the pattern. Tracing may be stopped at any time by turning the tracing feed rate control knob 58 to the zero position, thereby closing limit switch 113LS (94) which is arranged for operation by the potentiometer shaft. Relay 207CR will be energized upon closure of the limit switch and solenoid 107SOL (99) will be energized to short the longitudinal and vertical slides and prevent rotation of the resolvers, due to opening of the contacts 207CR in line 91.

The "Depth Retract" push button 61 (105) controls the energization of relay 210CR which breaks the holding circuit for the "Depth Trace" relay 209CR and power feeds the cross slide in the "Out" direction due to closure of contacts 210CR in line 186 which energizes relay 502CR.

While we have shown and described one embodiment of our invention herein, it is to be understood that it is capable of being carried out in a variety of ways. Changes therefore may be made in the construction and arrangement of our pattern controlled milling machine without departing from the spirit and scope of the invention as expressed in the appended claims, which are intended to encompass the patentable novelty inherent in our invention as broadly as is possible in view of the prior art.

We claim:

1. In an automatic tracing apparatus having a pair of slides supported for movement at right angles to one another to provide universal two-dimensional movement between a tracer and a pattern, and a servomotor for operating each of the slides, the combination of a tracing finger adapted to cooperate with said pattern, said finger being supported for both axial movement in the direction of its longitudinal axis and for tilting movement in response to sidewise pressure applied to said finger, a single transducer unit controlled by either of said movements of said finger, or by combinations of the two movements for producing an error signal indicating a departure of said finger from a position of normal deflection, an angularly settable device for conjointly controlling said servomotors to determine the direction of movement of said tracing finger relative to said pattern, and a servomotor controlled by said error signal for adjusting the position of said settable device to restore said tracing finger to its position of normal deflection and cause the finger to follow the contour of the pattern.

2. In an automatic tracing apparatus having three slides supported for movement in three mutually perpendicular directions to provide universal three-dimensional movement between a tracer and a pattern, and a servo motor for operating each of the slides, the combination of a tracing finger on said tracer adapted to cooperate with said pattern, said finger being supported for both axial movement in the direction of its longitudinal axis and for tilting movement in response to sidewise pressure applied to said finger, means controlled by either of said movements of said finger, or by combinations of the two movements, for producing an error voltage which is a measure of the departure of said finger from a position of normal deflection, a source of feed rate voltage, angularly settable means for resolving both said error voltage and said feed rate voltage into sine and cosine components and combining them in quadrature relationship to provide two output voltages, means for applying one of the output voltages to the servo motor associated with one of said slides, and means for selectively applying the other output voltage to the servo motor for either of the remaining two slides whereby 360 degree depth tracing in either of two mutually perpendicular planes may be effected.

3. The machine of claim 2 including a servo motor controlled by said error voltage for adjusting the position of said angularly settable means to restore said tracing finger to its position of normal deflection and cause said finger to follow the contour of the pattern.

4. The machine of claim 2 including means associated with each of said slides for individually adjusting the proportion of said error voltage combined in quadrature with said feed rate voltage in each of said output voltages.

5. In an automatic tracing apparatus having three slides supported for movement in three mutually perpendicular directions to provide universal three-dimensional movement between a tracer and a pattern, and a servo motor for operating each of the slides, the combination of a tracing finger on said tracer adapted to cooperate with said pattern, said finger being supported for axial movement in the direction of its longitudinal axis and for tilting movement in response to sidewise pressure applied to said finger, means controlled by either of said movements of said finger, or by combinations of the two movements, for producing an error voltage which is a measure of the departure of said finger from a position of normal deflection, a source of feed rate voltage, angularly settable means for resolving both said error voltage and said feed rate voltage into sine and cosine components and combining them in quadrature relationship to provide two output voltages, means for selectively applying one of the output voltages to either one of two of said servo motors, and means for selectively applying the other output voltage to either the third servo motor or to the non-selected one of the two first-mentioned servo motors.

6. The machine of claim 5 including a servo motor controlled by said error voltage for adjusting the position of said angularly settable means to restore said tracing finger to its position of normal deflection and cause said finger to follow the contour of the pattern.

7. In an automatic tracing apparatus having a pair of slides supported for movement at right angles to one another to provide universal two-dimensional movement between a tracer and a pattern, and a servomotor for operating each of the slides, the combination of a tracing finger on said tracer adapted to cooperate with said pattern, said finger being supported for both axial movement in the direction of its longitudinal axis and for tilting movement in response to sidewise pressure applied to said finger, a single transducer unit controlled by either of said movements of said finger, or by combinations of the two movements, for producing an error signal which is a measure of the departure of the finger from a position of normal deflection, a source of feed rate voltage, angularly settable means for resolving said feed rate voltage into sine and cosine components, means for applying one of the voltage components to one of the servo motors associated with the slides and the other voltage component to the other servomotor associated with the slides, and a third servo motor controlled by said error signal for adjusting the position of said angularly settable means to restore said tracing finger to its position of normal deflection and cause the finger to follow the contour of the pattern.

8. In an automatic tracing apparatus having three slides supported for movement in three mutually perpendicular directions to provide universal three-dimensional movement between a tracer and a pattern, and a servomotor for operating each of the slides, the combination of a tracing finger on said tracer adapted to cooperate with said pattern, said finger being supported for both axial movement in the direction of its longitudinal axis and for tilting movement in response to sidewise pressure applied to said finger, means controlled by either of said movements of said finger, or combinations of the two movements, for producing an error voltage which is a measure of the departure of the finger from a position of normal deflection, a source of feed rate voltage, angularly settable means for resolving said feed rate voltage into sine and cosine components, means for selectively applying one of the voltage components to either one of two of said servo motors, means for selectively applying the other voltage component either to the remaining servo motor or to the non-selected one of the two first-mentioned servo motors, and a fourth servo motor controlled by said error voltage for adjusting the position of said angularly settable means to restore said tracing finger to its position of normal deflection and cause the finger to follow the contour of the pattern.

9. In an automatic tracing apparatus having three slides supported for movement in three mutually perpendicular directions to provide universal three-dimensional movement between a tracer and a pattern, and a servomotor for operating each of the slides, the combination of a tracing finger on said tracer adapted to cooperate with said pattern, said finger being supported for both axial movement in the direction of its longitudinal axis and for tilting movement in response to sidewise pressure applied to said finger, means controlled by either of said movements of said finger, or by combinations of the two movements, for producing an error voltage which is a measure of the departure of the finger from a position of normal deflection, a source of feed rate voltage, angularly settable means for resolving said feed rate voltage into sine and cosine components, means for applying one of the voltage components to the servo motor associated with one of the slides, means for selectively applying the other output voltage to the servomotor for either of the other two slides, and a servomotor controlled by said error voltage for adjusting the positiion of said angularly settable means to restore said tracing finger to its position of normal deflection and cause the finger to follow the contour of the pattern.

10. In a pattern controlled reproducing machine having three transversely movable slides, a tracer supported on one of said slides for movement in any one of three mutually perpendicular directions relative to a pattern, and a servomotor for operating each of the slides, the combination of a source of feed rate voltage, angularly settable means for resolving said feed rate voltage into a sine component and a cosine component, means for selectively applying one of the voltage components to either one of two of the servo motors, and means for selectively applying the other output voltage to either the third servo motor or to the non-selected one of said two first-mentioned servomotors whereby 360 degree tracing in any one of three perpendicular planes may be effected.

11. In an automatic tracing apparatus having three slides supported for movement in three mutually perpendicular directions to provide universal three-dimensional movement between a tracer and a pattern, and a servomotor for operating each of the slides, the combination of a source of feed rate voltage, angularly settable means for resolving said feed rate voltage into a sine component and a cosine component, means for applying one of the voltage components to the servomotor associated with one of said slides, and means for selectively applying the other output voltage to the servomotor for either of the remaining two slides whereby 360 degree depth tracing in either of two mutually perpendicular planes may be effected.

References Cited in the file of this patent

UNITED STATES PATENTS

| | | |
|---|---|---|
| 2,455,882 | Shaw | Dec. 7, 1948 |
| 2,559,575 | Fryklund et al. | July 3, 1951 |
| 2,718,819 | Stephan | Sept. 27, 1955 |
| 2,814,239 | Lavieri et al. | Nov. 26, 1957 |
| 2,828,673 | Campbell | Apr. 1, 1958 |
| 2,866,153 | Rhoades | Dec. 23, 1958 |

FOREIGN PATENTS

| | | |
|---|---|---|
| 1,121,579 | France | Apr. 21, 1956 |